(12) United States Patent
Yochum

(10) Patent No.: US 10,665,005 B2
(45) Date of Patent: May 26, 2020

(54) DATA-BASED MEMORABILIA PRODUCT AND METHOD OF MAKING THE SAME

(71) Applicant: David Joseph Yochum, Pittsburgh, PA (US)

(72) Inventor: David Joseph Yochum, Pittsburgh, PA (US)

( * ) Notice: Subject to any disclaimer, the term of this patent is extended or adjusted under 35 U.S.C. 154(b) by 0 days.

(21) Appl. No.: 15/760,384

(22) PCT Filed: Sep. 16, 2016

(86) PCT No.: PCT/US2016/052062
§ 371 (c)(1),
(2) Date: Mar. 15, 2018

(87) PCT Pub. No.: WO2017/049037
PCT Pub. Date: Mar. 23, 2017

(65) Prior Publication Data
US 2019/0057530 A1 Feb. 21, 2019

Related U.S. Application Data

(60) Provisional application No. 62/219,189, filed on Sep. 16, 2015.

(51) Int. Cl.
*G06T 11/60* (2006.01)
*G06Q 30/02* (2012.01)
(Continued)

(52) U.S. Cl.
CPC .............. *G06T 11/60* (2013.01); *A41B 1/08* (2013.01); *A41D 1/002* (2013.01); *G06Q 30/00* (2013.01);
(Continued)

(58) Field of Classification Search
CPC ........ G06T 11/60; G06Q 10/10; G06Q 30/02; G06Q 50/00; G06Q 50/184; G06F 17/50
See application file for complete search history.

(56) References Cited

U.S. PATENT DOCUMENTS 10,176,636 B1 * 1/2019 Neustein .............. A41D 27/085
2004/0204859 A1 10/2004 Knoblach
(Continued)

FOREIGN PATENT DOCUMENTS

WO 2015130773 A1 3/2015

OTHER PUBLICATIONS

Oxford English Dictionary definition of automatic, https://en.oxforddictionaries.com/definition/automatic, downloaded on Jun. 4, 2019. (Year: 2019).*

(Continued)

*Primary Examiner* — Jeffery A Brier
(74) *Attorney, Agent, or Firm* — Dentons Cohen & Grigsby, P.C.

(57) ABSTRACT

A data-based memorabilia product and process of making the same is disclosed. The process includes defining individual data items in a data set on a hierarchical scale as common or uncommon based on a variation from a central tendency, wherein the data items are related to the intellectual property output and physical property output of an individual. Once defined, the data items may be sorted, structured, and correlated between the common data set and uncommon data set with one another, such as correlating an item in the common data set with an item in the uncommon data set-to form a correlative data item. A user of the method may influence the data selection based on personal preferences. Digital illustrations, physical illustrations, and physical products may be manufactured based on the method and at least one modified correlative data item.

19 Claims, 12 Drawing Sheets

(51) Int. Cl.
*G06Q 30/00* (2012.01)
*G06Q 50/10* (2012.01)
*A41B 1/08* (2006.01)
*A41D 1/00* (2018.01)
*G06Q 50/18* (2012.01)

(52) U.S. Cl.
CPC ......... *G06Q 30/0241* (2013.01); *G06Q 50/10* (2013.01); *G06Q 50/184* (2013.01)

(56) References Cited

U.S. PATENT DOCUMENTS

| | | |
|---|---|---|
| 2007/0136115 A1 | 6/2007 | Doganaksoy et al. |
| 2011/0154626 A1 | 6/2011 | Vandenbogart |
| 2013/0037606 A1* | 2/2013 | Murdoch ............... G06K 19/00 235/375 |

OTHER PUBLICATIONS

Oxford English Dictionary definition of autonomous, https://en.oxforddictionaries.com/definition/autonomous, downloaded on Jun. 4, 2019. (Year: 2019).*
International Search Report and Written Opinion for PCT/US2016/52062, dated Dec. 20, 2016. pp. 1-13.

* cited by examiner

DATA-BASED MEMORABILIA PRODUCT AND METHOD OF MAKING THE SAME

The present application is a § 371 application of PCT/US2016/052062, filed on Sep. 16, 2016, which claims the benefit under 35 U.S.C. § 119(e) of prior U.S. Provisional Application No. 62/219,189 filed Sep. 16, 2015, having the title "Data-Based Memorabilia Product and Method of Making the Same," the disclosure of each of which is incorporated herein by reference in its entirety.

BACKGROUND

The specification generally relates to a product manufacture system for the intersecting fields of information, fashion, and technology, wherein scientific and mathematic processes, structures, and methods, as well as scientific and mathematic computer software programs, automatically or semi-automatically manufacture products. The products apply one given individual's previously measured intellectual property data and previously measured physical property data. This data is hosted among, and further served by the products.

Intellectual property data is data attached to intangible property manufactured, in part or in whole, by the given individual, such as digital number, text, image, audio, and/or video, for example. Physical property data is data attached to tangible property manufactured, in part or in whole, by the given individual, such as physical textiles, for example. Data is generally defined as data sets and data set values, and data is manufactured by the given individual among one or more of defined space and/or time, such as the defined space and/or time of the given individual's one event, for example.

SUMMARY

In general, innovative aspects of the subject matter described in this specification can be implemented in methods that include, but are not limited to, the systematic manufacture of one or more digital illustration medium product; and/or physical illustration medium product; and/or physical medium product; and/or tag product, including product thereof; and/or dock product, including product thereof; and/or measured sale product, including product thereof.

In particular, innovative aspects of the subject manner described in this specification can be implemented in methods that include, but are not limited to, the engineering of one automatic or semi-automatic product manufacture system, wherein one given individual's previously measured intellectual property data (including intellectual property thereof) and previously measured physical property data (including physical property thereof) is compressed by applying scientific and mathematic processes, structures, and methods. Wherein scientific and mathematic processes, structures, and methods are applied, the system manufactures one or more product concurrently and congruently.

In particular, an innovative aspect of the subject matter described in this specification includes the application of one scientific and mathematic structure which is most similar in nature to an inverted pyramid information structure. Inverted pyramid information structure is an encoded, hierarchical data structure which sorts, hosts, and serves smaller databased quantities of high-priority data (i.e., top-tier uncommon data) first to the product consumer, and which sorts, hosts, and serves larger databased quantities of low-priority data (i.e., bottom-tier common data) last to the product consumer. Wherein the data structure may be applied to manufacture product, the product manufacturer compresses the structure by applying methods which further sort, correlate, assimilate, and scale data among the structure. The product consumer may decompress and otherwise revert the structure by applying reversion methods and technologies, such as one or more phone, tablet, watch, and/or headset device which applies sensory stimuli- and/or augmented reality-based reversion methods, for example.

In particular, another innovative aspect of the subject matter described in this specification includes the application of scientific and mathematic processes, structures, and methods engineered for demand-driven product manufacture systems, such as demand-drive additive product manufacture systems, for example. Demand-driven product manufacture systems may be modified per demand of the product manufacturer and/or may be modified per demand of the product consumer, such as modified per demand of the product consumer attending one given individual's event.

Particular implementations may realize none, or one or more of the following advantages.

In methods that include one or more digital illustration medium product, advantages of implementing innovative aspects of the subject matter described in this specification include the efficient and accurate manufacture of digital illustration medium product. This includes efficient and accurate application of uncommon data and common data, wherein uncommon data comprises previously measured data of largest variation from a central tendency; and common data comprises previously measured data of smallest and/or no variation from a central tendency. Further, this includes efficient and accurate application of a computer and/or computer software program such as a digital illustration medium design software program.

In methods that include one or more physical illustration medium product, advantages of implementing innovative aspects of the subject matter described in this specification include the efficient and accurate manufacture of physical illustration medium product. This includes efficient and accurate application of uncommon data and common data as described prior. Further, this includes the efficient and accurate application of a computer and/or computer software program such as a physical illustration medium design software program.

In methods that include one or more physical medium product, advantages of implementing innovative aspects of the subject matter described in this specification include the efficient and accurate manufacture of physical medium product. This includes efficient and accurate application of uncommon data and common data as described prior. Further, this includes the efficient and accurate application of a computer and/or computer software program such as a physical medium design software program.

In methods that include one or more tag product, including product thereof, advantages of implementing innovative aspects of the subject matter described in this specification include the efficient and accurate manufacture of tag product, including product thereof. This includes efficient and accurate application of uncommon data and common data as described prior. Further, this includes the efficient and accurate application of a computer and/or computer software program such as a quick response (QR) code tag design software program; a near-field communication (NFC) proximity tag design software program; an augmented reality tag design software program; a digital audio/video medium design software program; an advertisement serving software program; and/or a network software program.

In methods that include one or more physical property product, advantages of implementing innovative aspects of the subject matter described in this specification include the efficient and accurate manufactured attachment of physical property product. This includes efficient and accurate application of uncommon data and common data as described prior. Further, this includes the efficient and accurate application of a computer and/or computer software program such as a physical medium design software program.

In methods that include one or more dock product, including product thereof, advantages of implementing innovative aspects of the subject matter described in this specification include the efficient and accurate manufacture of dock product, including product thereof. This includes efficient and accurate application of uncommon data and common data as described prior. Further, this includes the efficient and accurate application of a computer and/or computer software program such as an augmented reality tag design software program, a digital audio/video medium design software program, an advertisement serving software program, a network software program, and/or a sensory stimuli design software program.

In methods that include one or more measured sale product, including product thereof, advantages of implementing innovative aspects of the subject matter described in this specification include the efficient and accurate manufacture of measured sale product, including product thereof. This includes the efficient and accurate application of uncommon data and common data as described prior. Further, this includes the efficient and accurate application of a computer and/or computer software program such as a network software program, a measured database software program, a measured database update software program, a paywall software program, an advertisement serving software program, a product consumer payment software program, and/or a network software program.

In general, industries wherein implementation may realize more of the advantages described prior include, but are not limited to, advertising, including queued advertisements and synchronized advertisements; apparel, including men's and women's luxury athletic apparel and men's and women's luxury fashion apparel; arts, including audio arts, illustrative arts, image arts, number arts, text arts, and video arts; computers, including computer software programming, computer algorithm programming, computer microchips, and computer networks; communications, including visual communications design; data management, including data analysis, data compression and decompression, data encoding and decoding, data hosting and serving, data profiling, data transmission and reception, data visualization, and database applications, including database and data-based manufacturing applications; economics, including behavioral economics; education; electronics, including battery-powered mobile electronic devices and mobile electronic devices' battery-charging docks; engineering, including systems engineering; entertainment, including athletic entertainment events and theatric entertainment events; finance, including financial paywalls and financial payments processing; information science, including information design; information health science, including biometric information and psychometric information; interactive technology, including augmented reality technology, haptic technology, sensor technology, and tag technology; manufacturing, including database and data-based product manufacturing, and demand-driven product manufacturing, including demand-driven additive product manufacturing and demand-driven subtractive product manufacturing; mathematics, including mathematical statistics; memorabilia, including athletic entertainment events memorabilia and theatric entertainment events memorabilia; science; and textiles, including electronic textiles, battery-powered electronic textiles and electronic textiles' battery-charging docks, and interactive textiles.

In particular, industries wherein implementations may realize most of the advantages described prior include, but are not limited to, industries described prior wherein there is need for one automatic or semi-automatic product manufacture system, and further, wherein there is need for larger databased quantities of one given individual's previously measured intellectual property data and previously measured physical property data to regularly manufacture product by applying scientific and mathematic processes, structures, and methods. Even further, industries wherein implementations may realize most of the advantages described prior include, but are not limited to, industries described prior wherein larger databased quantities of one given individual's low-priority data (i.e. bottom-tier common data) are infrequently, inefficiently, and/or inaccurately served to the product consumer, or not served to the product consumer. For example, one industry wherein implementations may realize most of the advantages described prior includes, but is not limited to the North American professional athletic entertainment industry. For reference purpose, the North American professional athletic entertainment industry is an industry which is regularly comprised of more than 5,000 professional athlete individuals, and an industry which is regularly comprised of more than 5,000 professional athletic events.

DETAILED DESCRIPTION

Description of the embodied invention is directed to a new and useful product manufacture system 130. The system 130 comprises processes 5, 5a, 5b, 15, 25, 35, 45, 55, 85, 105, 115 and products 10, 20, 21, 30, 31, 32, 33, 34, 40, 41, 50, 51, 60, 61, 62, 63, 64, 66, 67, 68, 71, 76, 77, 78, 79, 90, 96, 97, 98, 99, 100, 101, 102, 103, 110, 111, 112, 113, 114, 120 attached by a product 120 manufacturer. For reference purpose, and within the system 130, it should be known that system 130 components include, but are not limited to, one or more digital medium, physical medium, tag, including product thereof, dock, including product thereof, as well as one or more portion and/or proportion of intellectual property data, including intellectual property thereof, and physical property data, including physical property thereof. This description of the embodied invention is not intended in a limiting sense, and is made solely for the purpose of illustrating general principles and construction of the system 130.

For reference purpose, and solely for purposes of illustrating general principles and construction of the system 130, it should be known that the embodiment of one given individual is one given athlete. The embodiment of one given individual is not limited to one given athlete, and may be any other one given individual, such as one given entertainer, for example; and/or may be any other one given cohort of individuals, such as one given cast of entertainers, for example; and/or may be any other one given individual object which produces previously measured intellectual property data and/or physical property data; and/or may be any other one given cohort of individual objects which produces previously measured intellectual property data and/or physical property data. Beyond that which is addressed herein, there exist additional modifications that can be made to produce alternative embodiments of the invention, such as the addition and/or subtraction of one or more hierarchical tier of previously measured intellectual property data and/or physical property data to produce binary and/or non-binary embodiments of the invention, for example. For reference purpose, one hierarchical tier of previously measured intellectual property data and/or physical property data is described in forthcoming paragraphs below, and these and additional modifications will be apparent to those skilled in the arts.

Figure 1:
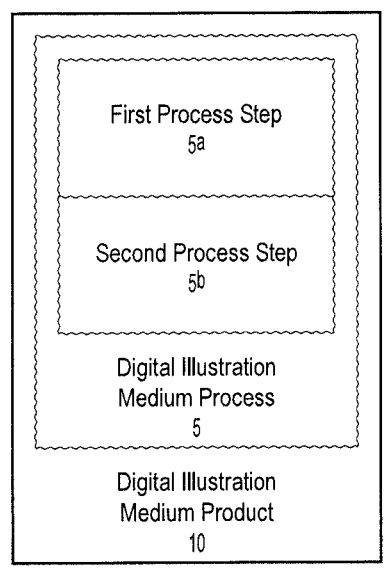
FIG. 1 is a block flow diagram of a digital illustration medium process, which produces a digital illustration medium product.

FIG. 1 shows a block flow diagram of a new and useful digital illustration medium process 5, and digital illustration medium product 10. The product 10 comprises the digital illustration medium embodiment of one given individual's intellectual property data, such as one given athlete's intellectual property data. While the following description describes the invention as directed to one given individual as an athlete, the invention may find applicability to any other given individual, or cohort of individuals, as indicated above. The process 5 comprises the two-step process which produces the product 10. For reference purpose, the process 5 steps 5a, 5b are summarized briefly as follows.

The digital illustration medium process 5 first step 5a, to be completed by computer and computer software program, such as computer digital illustration medium design software program, for example, and/or to be completed by manual pencil and paper and next imported to computer and computer software program by person, includes methods which define, sort, structure, correlate, assimilate, and scale one given athlete's intellectual property data (including intellectual property thereof) among the incomplete digital illustration medium product 10, wherein intellectual property data includes uncommon intellectual property data and common intellectual property data.

For reference purpose, and within the digital illustration medium process 5 as well as the product manufacture system 130, it should be known that intellectual property data is data attached to intellectual property, and includes, but is not limited to, data sets and data set values. Intellectual property may be defined as an intangible property manufactured, in part or in whole, by one given athlete and includes, but is not limited to, any number, text, image, audio, and/or video, for example. Illustration may be defined as a compound and/or composite of intellectual property.

For reference purpose, and within the digital illustration medium process 5 as well as the product manufacture system 130, it should be known that intellectual property data may be previously hosted and/or served among one hierarchical tier database structure, wherein the intellectual property data may be sorted by previous measurements of space and/or time. One hierarchical tier database structure includes, but is not limited to, one or more top tier and one or more bottom tier, and is best understood by referencing an example as follows.

For example, and within the digital illustration medium process 5 as well as the product manufacture system 130, one given athlete's intellectual property data (including intellectual property thereof) includes, but is not limited to, the intellectual property data previously hosted and/or served among one hierarchical tier database structure most similar in nature to the served database structure product of one partitioned Web search engine results page, wherein previously measured uncommon intellectual property data sorted by space and/or time is further sorted among one top tier of the database structure, and wherein previously measured common intellectual property data sorted by space and/or time is further sorted among one bottom tier of the database structure.

For reference purpose, and within the digital illustration medium process 5 as well as the product manufacture system 130, it should be known that uncommon intellectual property data may be defined as the given athlete's previously measured data of largest variation from a central tendency; and common intellectual property data may be defined as the given athlete's previously measured data of smallest and/or no variation from a central tendency. A variation includes, but is not limited to, any measure of deviation, standard deviation, absolute variation, variance, and/or any combination thereof, for example. A central tendency includes, but is not limited to, any mean, median, mode, and/or any combination thereof, for example.

For reference purpose, and within the product manufacture system 130, it should be known that physical property data is data attached to physical property, and includes, but is not limited to, data sets and data set values. Physical property may be defined as a tangible property manufactured, in part or in whole, by one given athlete and includes, but is not limited to, any physical medium applied by, and/or attached to the given athlete among the space and/or time of one or more of the given athlete's athletic events, such as athletic textiles previously applied by, and/or attached to the given athlete's body among the space and/or time of one athletic event, for example.

For reference purpose, and within the product manufacture system 130, it should be known that physical property data is previously hosted and/or served among one hierarchical tier database structure, wherein the physical property data may be sorted by previous measurements of space and/or time. One hierarchical tier database structure includes, but is not limited to, one or more top tier and one or more bottom tier, and is best understood by referencing an example as follows.

For example, and within the product manufacture system 130, one given athlete's physical property data includes, but is not limited to, the physical property data (including physical property thereof) previously hosted and/or served among one hierarchical tier database structure most similar in nature to the served database structure product of one partitioned Web search engine results page, wherein previously measured uncommon physical property data sorted by space and/or time is further sorted among one top tier of the database structure, and wherein previously measured common physical property data sorted by space and/or time is further sorted among one bottom tier of the database structure.

For reference purpose, and within the product manufacture system 130, it should be known that uncommon physical property data may be defined as the given athlete's previously measured data of largest variation from a central tendency; and common physical property data may be defined as the given athlete's previously measured data of smallest and/or no variation from a central tendency. A variation includes, but is not limited to, any measure of deviation, standard deviation, absolute variation, variance, and/or any combination thereof, for example. A central tendency includes, but is not limited to, any mean, median, mode, and/or any combination thereof, for example.

Next, continuing the digital illustration medium process 5 first step 5*a*, two or more portions and/or proportions of one given athlete's intellectual property data are sorted among two or more hierarchical tiers. Among the two or more hierarchical tiers, the top hierarchical tier includes one or more portion and/or proportion of the given athlete's uncommon intellectual property data, and the bottom hierarchical tier includes one or more portion and/or proportion of the given athlete's common intellectual property data. A computer and computer software program may automatically or semi-automatically sort the given athlete's intellectual property data and may automatically or semi-automatically render and record the sortation, or a person manually sorts the given athlete's intellectual property data and manually renders and records the sortation. Sortation is recorded for later serving intellectual property data by applying digital tag products 32, 63, 67, sensory stimuli product 76, measured database product 96, and/or measured database modifier product 100, and is described in forthcoming paragraphs below.

Next, within the digital illustration medium process 5 first step 5*a*, correlation is defined among one or more portion and/or proportion of one given athlete's bottom-tier common intellectual property data, and one or more portion and/or proportion of the given athlete's top-tier uncommon intellectual property data. For reference purpose, and within the process 5 first step 5*a*, correlation is defined for the function of mathematical assimilation, as described in forthcoming paragraphs below. A computer and computer software program may automatically or semi-automatically define correlation and may automatically or semi-automatically render and record the correlation, or a person manually defines correlation and manually renders and records the correlation. Correlation is recorded for later serving intellectual property data by applying digital tag products 32, 63, 67, sensory stimuli product 76, measured database product 96, and/or measured database modifier product 100, and is described in forthcoming paragraphs below.

Next, within the digital illustration medium process 5 first step 5*a*, and wherein correlation is defined, one or more portion and/or proportion of one given athlete's bottom-tier common intellectual property data may be assimilated among one or more portion and/or proportion of the given athlete's top-tier uncommon intellectual property data. For reference purpose, and within the process 5 first step 5*a*, assimilation is defined as applying one or more mathematical grid, mathematical expression, and/or mathematical equation wherein one or more portion and/or proportion of the given athlete's bottom-tier common intellectual property data modifies one or more portion and/or proportion of the given athlete's top-tier uncommon intellectual property data. A computer and computer software program may automatically or semi-automatically assimilate and may automatically or semi-automatically render and record the assimilation, or a person manually assimilates and manually renders and records the assimilation. Assimilation is recorded for later serving intellectual property data by applying digital tag products 32, 63, 67, sensory stimuli product 76, measured database product 96, and/or measured database modifier product 100, and is described in forthcoming paragraphs below. Assimilation, as well as the process 5 first step 5*a*, is best understood by referencing an example as follows.

For example, and within the digital illustration medium process 5 first step 5*a*, one portion of one given athlete's bottom-tier common intellectual property data includes one data set and data set value of 9 athletic awards. In the example, the data set value is mathematically represented as 9. Continuing the example, one portion of the given athlete's top-tier uncommon intellectual property data includes one data set and data set value of 1 sailboat sail. In the example, the data set and data set value is mathematically represented as 1x. Continuing the example, and to execute assimilation, the mathematical expression (9)(1x) is applied to produce a mathematical product result of 9x. Thus, the incomplete digital illustration medium product 10 includes 9x, or 9 sailboat sails rendered by a computer and computer digital illustration medium design software program.

A function of assimilation is to compress and host one or more portion and/or proportion of one given athlete's bottom-tier common intellectual property data among the space and/or time of one or more portion and/or proportion of the given athlete's top-tier uncommon intellectual property data, as well as among the incomplete digital illustration medium product 10.

Next, within the digital illustration medium process 5 first step 5*a*, and wherein one or more portion and/or proportion of one given athlete's bottom-tier common intellectual property data may be assimilated, the one or more portion and/or proportion of the given athlete's top-tier uncommon intellectual property data is modified by scale. For reference purpose, and within the process 5 first step 5*a*, modified scale is defined as applying one or more mathematical grid, mathematical expression, and/or mathematical equation wherein one or more portion and/or proportion of the given athlete's bottom-tier common intellectual property data modifies the previously measured space and/or time scale of one or more portion and/or proportion of the given athlete's top-tier uncommon intellectual property data. A computer and computer software program may automatically or semi-automatically modify the scale and may automatically or semi-automatically render and record the modified scale; or a person manually modifies scale and manually renders and records the modified scale. Modified scale is recorded for later serving intellectual property data by applying digital tag products 32, 63, 67, sensory stimuli product 76, measured database product 96, and/or measured database modifier product 100, and is described in forthcoming paragraphs below. Modified scale, as well as the process 5 first step 5*a*, is best understood by referencing a linear example as follows.

For example, and within the digital illustration medium process 5 first step 5*a*, one portion of one given athlete's bottom-tier common intellectual property data includes one data set and data set value of 9 athletic awards. In the example, the data set value is mathematically represented as 9. Continuing the example, one portion of the given athlete's top-tier uncommon intellectual property data includes one data set and data set value of 1 sailboat sail. In the example, the data set and data set value is mathematically represented as 1x. Continuing the example, and to execute assimilation, the mathematical expression (9)(1x) is applied to produce a mathematical product result of 9x. Thus, the incomplete digital illustration medium product 10 includes 9x, or 9 sailboat sails rendered by a computer and computer digital illustration medium design software program. Furthermore, to execute modified scale, and wherein the previously measured spatial scale of one portion of the given athlete's top-tier uncommon intellectual property data is mathematically represented as 1y, the mathematical expression (9x)(1y) is applied to produce a mathematical product result of 9xy.

A function of modified scale is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the incomplete digital illustration medium product 10.

Lastly, within the digital illustration medium process 5 first step 5*a*, and wherein one or more portion and/or proportion of one given athlete's top-tier uncommon intellectual property data is scaled, the one or more portion and/or proportion of the given athlete's top-tier uncommon intellectual property data is modified by sortation. For reference purpose, and within the process 5 first step 5*a*, modified sortation is defined as applying one or more mathematical grid, mathematical expression, and/or mathematical equation wherein one or more portion and/or proportion of the given athlete's bottom-tier common intellectual property data modifies the previously measured space and/or time sortation of one or more portion and/or proportion of the given athlete's top-tier uncommon intellectual property data. A computer and computer software program may automatically or semi-automatically modify sortation and may automatically or semi-automatically render and record the modified sortation, or a person manually modifies sortation and manually renders and records the modified sortation. Modified sortation is recorded for later serving intellectual property data by applying digital tag products 32, 63, 67, sensory stimuli product 76, measured database product 96, and/or measured database modifier product 100, and is described in forthcoming paragraphs below.

A function of modified sortation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the incomplete digital illustration medium product 10.

It should now be apparent how the process 5 first step 5*a* methods define, sort, structure, correlate, assimilate, and scale one given athlete's intellectual property data among the incomplete digital illustration medium product 10, wherein intellectual property data includes uncommon intellectual property data and common intellectual property data.

If the digital illustration medium process 5 first step 5*a* is completed by computer and computer software program, this completes the process 5 first step 5*a*, and produces the incomplete digital illustration medium product 10 rendered and recorded in digital file format. If the process 5 first step 5*a* is completed by a person, such as by pencil and paper, the incomplete product 10 is next imported to computer and computer software program by any device which renders and records a digital file format.

The digital illustration medium process 5 second step 5*b*, to be completed by computer and computer software program, such as computer digital illustration medium design software program, for example, includes methods which further correlate, assimilate, scale, and sort one given athlete's intellectual property data among the incomplete digital illustration medium product 10, wherein intellectual property data includes uncommon intellectual property data and common intellectual property data.

Next, within the digital illustration medium process 5 second step 5*b*, correlation is defined among one or more portion and/or proportion of one given athlete's bottom-tier common intellectual property data (previously assimilated among one or more portion and/or proportion of the given athlete's top-tier uncommon intellectual property data within the digital illustration medium process 5 first step 5*a*), and one or more portion and/or proportion of computer software program data. For reference purpose, and within the process 5 second step 5*b*, correlation is defined for the function of mathematical assimilation, as described in forthcoming paragraphs below. A computer and computer software program may automatically or semi-automatically define correlation and may automatically or semi-automatically render and record correlation, or a person manually defines correlation and manually renders and records correlation. Correlation is recorded for later serving intellectual property data by applying digital tag products 32, 63, 67, sensory stimuli product 76, measured database product 96, and/or measured database modifier product 100, and is described in forthcoming paragraphs below.

For reference purpose, and within the digital illustration medium process 5 as well as the product manufacture system 130, it should be known that computer software program data is data attached to a computer software program tool, and includes, but is not limited to, data sets and data set values. A computer software program tool is defined as a computer software program product and/or process which modifies the incomplete digital illustration medium product 10, and is best understood by referencing an example as follows.

For example, and within the digital illustration medium process 5, a computer digital illustration medium design software program tool includes, but is not limited to, a product and/or process which modifies the incomplete digital illustration medium product 10, such as a computer digital illustration medium design software program tool which modifies product 10 brightnesses, brushes, colors, contrasts, hardnesses, highlights, hues, images, lights, movements, numbers, patterns, perspectives, saturations, scales, shadows, shapes, sounds, spaces, temperatures, texts, textures, times, vibrances, videos, and/or weights thereof.

Next, within the digital illustration medium process 5 second step 5*b*, and wherein correlation is defined, one or more portion and/or proportion of one given athlete's bottom-tier common intellectual property data may be assimilated among and one or more portion and/or proportion of computer software program data. For reference purpose, and within the process 5 second step 5*b*, assimilation is defined as applying one or more mathematical grid, mathematical expression, and/or mathematical equation wherein one or more portion and/or proportion of the given athlete's bottom-tier common intellectual property data modifies one or more portion and/or proportion of computer software program data. A computer and computer software program may automatically or semi-automatically assimilate and may automatically or semi-automatically render and record the assimilation, or a person manually assimilates and manually renders and records the assimilation. Assimilation is recorded for later serving intellectual property data by applying digital tag products 32, 63, 67, sensory stimuli product 76, measured database product 96, and/or measured database modifier product 100, and is described in forthcoming paragraphs below. Assimilation, as well as the process 5 second step 5*b*, is best understood by referencing an example as follows.

For example, and within the digital illustration medium process 5 second step 5*b*, one portion of one given athlete's bottom-tier common intellectual property data (previously assimilated among one or more portion and/or proportion of the given athlete's top-tier uncommon intellectual property data within the digital illustration medium process 5 first step 5*a*), includes one data set and data set value of 9 athletic awards. In the example, the data set value is mathematically represented as 9. Continuing the example, one portion of computer digital illustration medium design software program data includes one data set and data set value of 1 brightness. In the example, the data set and data set value is mathematically represented as 1x. Continuing the example, and to execute assimilation, the mathematical expression $(9)(1x)$ is applied to produce a mathematical product result of $9x$. Thus, the incomplete digital illustration medium product 10 includes $9x$, or 9 brightness rendered by a computer and computer digital illustration medium design software program.

A function of assimilation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the incomplete digital illustration medium product 10.

Next, within the digital illustration medium process 5 second step 5*b*, and wherein one or more portion and/or proportion of one given athlete's bottom-tier common intellectual property data may be assimilated, the one or more portion and/or proportion of the given athlete's top-tier uncommon intellectual property data is modified by scale. For reference purpose, and within the process 5 second step 5*b*, modified scale is defined as applying one or more mathematical grid, mathematical expression, and/or mathematical equation wherein one or more portion and/or proportion of the given athlete's bottom-tier common intellectual property data modifies the previously measured space and/or time scale of one or more portion and/or proportion of computer software program data. A computer and computer software program may automatically or semi-automatically modify scale and may automatically or semi-automatically render and record the modified scale; or a person manually modifies scale and manually renders and records the modified scale. Modified scale is recorded for later serving intellectual property data by applying digital tag products 32, 63, 67, sensory stimuli product 76, measured database product 96, and/or measured database modifier product 100, and is described in forthcoming paragraphs below. Modified scale, as well as the process 5 second step 5*b*, is best understood by referencing a linear example as follows.

For example, and within the digital illustration medium process 5 second step 5*b*, one portion of one given athlete's bottom-tier common intellectual property data (previously assimilated among one or more portion and/or proportion of the given athlete's top-tier uncommon intellectual property data within the digital illustration medium process 5 first step 5*a*), includes one data set and data set value of 9 athletic awards. In the example, the data set value is mathematically represented as 9. Continuing the example, one portion of computer digital illustration medium design software program data includes one data set and data set value of 1 brightness. In the example, the data set and data set value is mathematically represented as 1x. Continuing the example, and to execute assimilation, the mathematical expression $(9)(1x)$ is applied to produce a mathematical product result of $9x$. Thus, the incomplete digital illustration medium product 10 includes $9x$, or 9 brightness rendered by a computer and computer digital illustration medium design software program. Furthermore, to execute modified scale, and wherein the previously measured spatial scale of one portion of computer digital illustration medium design software program data is mathematically represented as 1y, the mathematical expression $(9x)(1y)$ is applied to produce a mathematical product result of $9xy$.

A function of modified scale is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the incomplete digital illustration medium product 10.

Lastly, within the digital illustration medium process 5 second step 5*b*, and wherein one or more portion and/or proportion of one given athlete's top-tier uncommon intellectual property data is scaled, the one or more portion and/or proportion of the given athlete's top-tier uncommon intellectual property data is modified by sortation. For reference purpose, and within the process 5 second step 5*b*, modified sortation is defined as applying one or more mathematical grid, mathematical expression, and/or mathematical equation wherein one or more portion and/or proportion of the given athlete's bottom-tier common intellectual property data modifies the previously measured space and/or time sortation of one or more portion and/or proportion of computer software program data. A computer and computer software program may automatically or semi-automatically modify sortation and may automatically or semi-automatically render and record the modified sortation, or a person manually modifies sortation and manually renders and records the modified sortation. Modified sortation is recorded for later serving intellectual property data by applying digital tag products 32, 63, 67, sensory stimuli product 76, measured database product 96, and/or measured database modifier product 100, and is described in forthcoming paragraphs below.

A function of modified sortation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the incomplete digital illustration medium product 10.

It should now be apparent how the process 5 second step 5b methods further correlate, assimilate, scale, and sort one given athlete's intellectual property data among the incomplete digital illustration medium product 10, wherein intellectual property data includes uncommon intellectual property data and common intellectual property data.

This completes the process 5 second step 5b, and produces the complete digital illustration medium product 10 rendered and recorded in digital file format.

Figure 2:
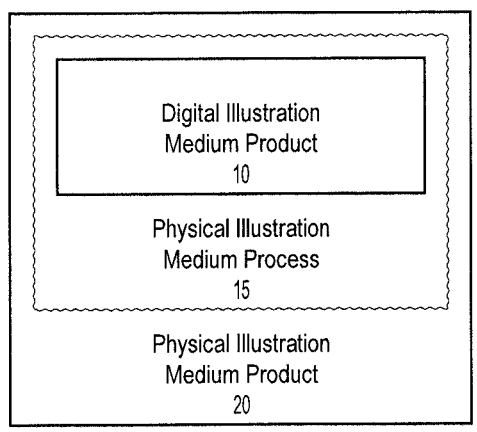
FIG. 2 is a block flow diagram of a physical illustration medium process, which produces a physical illustration medium product.

FIG. 2 shows a block flow diagram of a new and useful physical illustration medium process 15, and physical illustration medium product 20. The product 20 is the physical illustration medium embodiment of the digital medium illustration product 10. The process 15 includes assigning one or more applicable physical medium to produce the product 20; additionally or alternatively, includes methods which correlate, assimilate, scale, and sort one given athlete's intellectual property data and/or physical property data among product 20, and is summarized briefly as follows.

For reference purpose, and within physical illustration medium process 15 as well as the product manufacture system 130, it should be known that one or more applicable physical medium includes, but is not limited to, physical mediums such as inks, chemicals, dyes, fabrics, fibers, glasses, paints, metals, papers, paints, plastics, textiles, and/or woods, and further includes physical mediums which directly and/or indirectly produce, process, host, serve, and/or are modified by intellectual property data and/or physical property data. One or more applicable physical medium may directly and/or indirectly produce, process, host, serve, and/or modify the brightnesses, brushes, colors, contrasts, hardnesses, highlights, hues, images, lights, movements, numbers, patterns, perspectives, saturations, scales, shadows, shapes, sounds, spaces, temperatures, texts, textures, times, vibrances, videos, and/or weights thereof. One or more applicable physical medium may directly and/or indirectly produce, process, host, serve, and/or modify sensory stimuli such as optical, tactile, and/or thermal sensory stimuli, for example.

For reference purpose, and within the physical illustration medium process 15 as well as the product manufacture system 130, it should be known that one or more applicable conductive, resistive, reactive, and/or conduit physical medium grid, as well as one or more applicable computer microchip may be attached among one or more applicable physical medium. The attached computer microchip may further be directly and/or indirectly attached to one or more applicable computer network and/or computer network software program, and the attachments may even further produce, process, host, serve, and/or modify intellectual property data and/or physical property data, as well as sensory stimuli among the one or more physical medium, and among the space and/or time of one or more applicable event, such as the space and/or time of one given athlete's athletic event, for example.

For reference purpose, and within the physical illustration medium process 15 as well as the product manufacture system 130, it should be known that one or more applicable computer microchip attached among one or more applicable physical medium may be operated by electric current produced, processed, hosted, served, and/or modified by one or more battery, wherein battery maintenance functions—such as the function of inducing electric current to maintain a battery charge, for example—may be further modified among dock product 78.

Within the physical illustration medium process 15, one or more physical medium is applied to produce the physical illustration medium product 20 wherein one or more portion and/or proportion of one given athlete's bottom-tier common intellectual property data (described prior within the digital illustration medium process 5 first step 5a) and/or one or more portion and/or proportion of the given athlete's top-tier uncommon intellectual property data (described prior within the digital illustration medium process 5 first step 5a) exceeds one or more assigned data set value. A computer and computer software program, such as a computer physical illustration medium design software program, for example, may automatically or semi-automatically assign one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium; or a person manually assigns one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium.

Furthermore, a computer and computer software program may automatically or semi-automatically assign the one or more physical medium applied wherein one or more portion and/or proportion of the given athlete's bottom-tier common intellectual property data, and/or one or more portion and/or proportion of the given athlete's top-tier uncommon intellectual property data exceeds one or more assigned data set value; or a person manually assigns the one or more physical medium applied wherein one or more portion and/or proportion of the given athlete's bottom-tier common intellectual property data, and/or one or more portion and/or proportion of the given athlete's top-tier uncommon intellectual property data exceeds one or more assigned data set value.

For reference purpose, and within the physical illustration medium process 15 as well as the product manufacture system 130, it should be known that one given athlete's bottom-tier common intellectual property data and top-tier uncommon intellectual property data includes, but is not limited to, data sets and data set values attached to one portion and/or proportion of one hierarchical tier database structure (described prior within the digital illustration medium process 5 first step 5a), such as a data set value attached to one tier of the hierarchical tier database structure, for example.

Assigning the one or more physical medium applied to produce the physical illustration medium product 20 wherein one or more portion and/or proportion of the given athlete's bottom-tier common intellectual property data, and/or one or more portion and/or proportion of the given athlete's top-tier uncommon intellectual property data exceeds one or more assigned data set value is best understood by referencing an example as follows.

For example, within the physical illustration medium process 15, and wherein one portion of one given athlete's bottom-tier common intellectual property data (described prior within the digital illustration medium process 5 first step 5a) exceeds one assigned data set value, one ink physical medium is applied to produce the physical illustration medium product 20. In the example, the ink physical medium applied to produce the product 20 further produces optical sensory stimuli among the product 20, and the produced optical sensory stimuli is served among the space and/or time of the given athlete's one athletic event.

A function of assigning one or more physical medium to produce the physical illustration medium product 20 wherein one or more portion and/or proportion of one given athlete's bottom-tier common intellectual property data and/or one or more portion and/or proportion of the given athlete's top-tier uncommon intellectual property data exceeds one or more assigned data set value is to mark intellectual property data set value variations among product 20.

Additionally or alternatively, and within the physical illustration medium process 15, one or more physical medium is applied to produce the physical illustration medium product 20 wherein one or more portion and/or proportion of one given athlete's bottom-tier common physical property data (described prior within the digital illustration medium process 5 first step 5a) and/or one or more portion and/or proportion of the given athlete's top-tier uncommon physical property data (described prior within the digital illustration medium process 5 first step 5a) exceeds one or more assigned data set value. A computer and computer software program may automatically or semi-automatically assign one or more data set value wherein one or more portion and/or proportion of the given athlete's bottom-tier common physical property data, and/or one or more portion and/or proportion of the given athlete's top-tier uncommon physical property data must exceed to apply one or more physical medium; or a person manually assigns one or more data set value wherein one or more portion and/or proportion of the given athlete's bottom-tier common physical property data, and/or one or more portion and/or proportion of the given athlete's top-tier uncommon physical property data must exceed to apply one or more physical medium.

Furthermore, a computer and computer software program may automatically or semi-automatically assign the one or more physical medium applied wherein one or more portion and/or proportion of the given athlete's bottom-tier common physical property data, and/or one or more portion and/or proportion of the given athlete's top-tier uncommon physical property data exceeds one or more assigned data set value; or a person manually assigns the one or more physical medium applied wherein one or more portion and/or proportion of the given athlete's bottom-tier common physical property data, and/or one or more portion and/or proportion of the given athlete's top-tier uncommon physical property data exceeds one or more assigned data set value.

For reference purpose, and within the physical illustration medium process 15 as well as the product manufacture system 130, it should be known that one given athlete's bottom-tier common physical property data and top-tier uncommon physical property data includes, but is not limited to, data sets and data set values attached to one portion and/or proportion of the hierarchical tier database structure (described prior within the digital illustration medium process 5 first step 5a), such as a data set value attached to one tier of the hierarchical tier database structure, for example.

A function of assigning one or more physical medium to produce the physical illustration medium product 20 wherein one or more portion and/or proportion of one given athlete's bottom-tier common physical property data and/or one or more portion and/or proportion of the given athlete's top-tier uncommon physical property data exceeds one or more assigned data set value is to mark physical property data set value variations among product 20.

Additionally or alternatively, and to be completed by computer and computer software program, the physical illustration medium process 15 includes methods which correlate, assimilate, scale, and sort one given athlete's intellectual property data and/or physical property data among one or more physical illustration medium product 20. Methods which correlate, assimilate, scale, and sort the given athlete's intellectual property data and/or physical property data among product 20 include, but are not limited to, methods described prior, and is best understood by referencing an example as follows.

For example, and within the physical illustration medium process 15, correlation is defined among one or more portion and/or proportion of one given athlete's bottom-tier common intellectual property data (previously assimilated among one or more portion and/or proportion of the given athlete's top-tier uncommon intellectual property data within the digital illustration medium process 5 first step 5a), and one or more portion and/or proportion of computer physical illustration medium design software program data. For reference purpose, and within the process 15, correlation is defined for the function of mathematical assimilation, as described in forthcoming paragraphs below. A computer and computer physical illustration medium design software program may automatically or semi-automatically define correlation and may automatically or semi-automatically render correlation, or a person manually defines correlation and manually renders correlation.

For reference purpose, and within the physical illustration medium process 15 as well as the product manufacture system 130, it should be known that computer software program data is data attached to a computer software program tool, and includes, but is not limited to, data sets and data set values. A computer software program tool is defined as a computer software program product and/or process which modifies the physical illustration medium product 20, and is best understood by referencing an example as follows.

For example, and within the physical illustration medium process 15, a computer physical illustration medium design software program tool includes, but is not limited to, a product and/or process which modifies the physical illustration medium product 20, such as a computer physical illustration medium design software program tool which modifies product 20 brightnesses, brushes, colors, contrasts, hardnesses, highlights, hues, images, lights, movements, numbers, patterns, perspectives, saturations, scales, shadows, shapes, sounds, spaces, temperatures, texts, textures, times, vibrances, videos, and/or weights thereof.

Next, and within the physical illustration medium process 15, and wherein correlation is defined, one or more portion and/or proportion of one given athlete's bottom-tier common intellectual property data may be assimilated among one or more portion and/or proportion of, computer software program data. For reference purpose, and within the process 15, assimilation is defined as applying one or more mathematical grid, mathematical expression, and/or mathematical equation wherein one or more portion and/or proportion of the given athlete's bottom-tier common intellectual property data modifies one or more portion and/or proportion of computer software program data. A computer and computer software program may automatically or semi-automatically assimilate and may automatically or semi-automatically render the assimilation, or a person manually assimilates and manually renders the assimilation. Assimilation, as well as the process 15, is best understood by referencing an example as follows.

For example, and within the physical illustration medium process 15, one portion of one given athlete's bottom-tier common intellectual property data (previously assimilated among one or more portion and/or proportion of the given athlete's top-tier uncommon intellectual property data within the digital illustration medium process 5 first step 5*a*), includes one data set and data set value of 9 athletic awards. In the example, the data set value is mathematically represented as 9. Continuing the example, one portion of computer physical illustration medium design software program data includes one data set and data set value of 1 ounce of ink. In the example, the data set and data set value is mathematically represented as 1x. Continuing the example, and to execute assimilation, the mathematical expression (9)(1x) is applied to produce a mathematical product result of 9x. Thus, the physical illustration medium product 20 includes 9x, or 9 ounces of ink rendered by a computer and computer physical illustration medium design software program.

A function of assimilation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the physical illustration medium product 20.

For reference purpose, and within the physical illustration medium process 15 as well as the product manufacture system 130, it should be preferred, but not required, that additional and/or alternative methods apply physical property data attached to physical property product 41. Product 41 is described in forthcoming paragraphs below.

Figure 3:
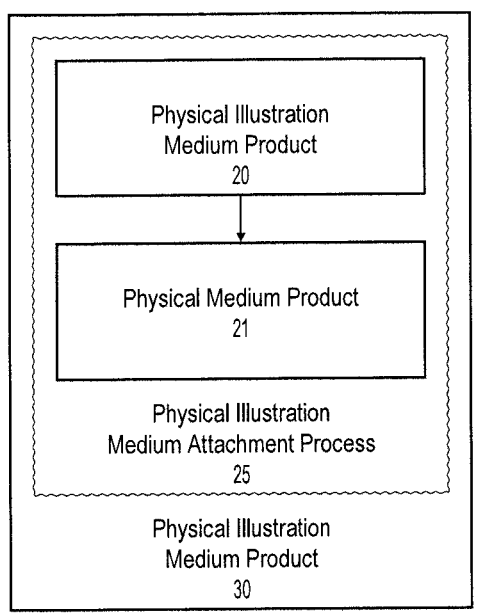
FIG. 3 is a block flow diagram of a physical illustration medium attachment process, which produces a physical illustration medium product.

FIG. 3 shows a block flow diagram of a new and useful physical illustration medium attachment process 25, and physical illustration medium product 30. The product 30 comprises the physical illustration medium product 20 attached to one or more physical medium product 21. The process 25 includes assigning one or more applicable physical medium to produce the product 21; additionally or alternatively, includes methods which correlate, assimilate, scale, and sort one given athlete's intellectual property and/or physical property data among product 21; includes assigning the space wherein product 20 is attached to the product 21, and is summarized briefly as follows.

Within the physical illustration medium attachment process 25, one or more physical medium may be applied to produce the physical medium product 21 wherein one or more portion and/or proportion of one given athlete's bottom-tier common intellectual property data (described prior within the digital illustration medium process 5 first step 5*a*) and/or one or more portion and/or proportion of the given athlete's top-tier uncommon intellectual property data (described prior within the digital illustration medium process 5 first step 5*a*) exceeds one or more assigned data set value. A computer and computer software program, such as a computer physical medium design software program, for example, may automatically or semi-automatically assign one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium; or a person manually assigns one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium.

Furthermore, a computer and computer software program may automatically or semi-automatically assign the one or more physical medium applied wherein one or more portion and/or proportion of the given athlete's bottom-tier common intellectual property data, and/or one or more portion and/or proportion of the given athlete's top-tier uncommon intellectual property data exceeds one or more assigned data set value; or a person manually assigns the one or more physical medium applied wherein one or more portion and/or proportion of the given athlete's bottom-tier common intellectual property data, and/or one or more portion and/or proportion of the given athlete's top-tier uncommon intellectual property data exceeds one or more assigned data set value.

Assigning the one or more physical medium applied to produce the physical medium product 21 wherein one or more portion and/or proportion of the given athlete's bottom-tier common intellectual property data, and/or one or more portion and/or proportion of the given athlete's top-tier uncommon intellectual property data exceeds one or more assigned data set value is best understood by referencing an example as follows.

For example, within the physical illustration medium attachment process 25, and wherein one portion of one given athlete's bottom-tier common intellectual property data (described prior within the digital illustration medium process 5 first step 5*a*) exceeds one assigned data set value, one textile physical medium is applied to produce the physical medium product 21. In the example, the textile physical medium applied to produce the product 21 further produces tactile sensory stimuli among the product 21, and the produced tactile sensory stimuli is served among the space and/or time the given athlete's one athletic event.

A function of assigning one or more physical medium to produce the physical medium product 21 wherein one or more portion and/or proportion of one given athlete's bottom-tier common intellectual property data and/or one or more portion and/or proportion of the given athlete's top-tier uncommon intellectual property data exceeds one or more assigned data set value is to mark intellectual property data set value variations among product 21.

Additionally or alternatively, and within the physical illustration medium attachment process 25, one or more physical medium may be applied to produce the physical medium product 21 wherein one or more portion and/or proportion of one given athlete's bottom-tier common physical property data and/or one or more portion and/or proportion of the given athlete's top-tier uncommon physical property data exceeds one or more assigned data set value. A computer and computer software program may automatically or semi-automatically assign one or more data set value wherein one or more portion and/or proportion of the given athlete's bottom-tier common physical property data, and/or one or more portion and/or proportion of the given athlete's top-tier uncommon physical property data must exceed to apply one or more physical medium; or a person manually assigns one or more data set value wherein one or more portion and/or proportion of the given athlete's bottom-tier common physical property data, and/or one or more portion and/or proportion of the given athlete's top-tier uncommon physical property data must exceed to apply one or more physical medium.

Furthermore, a computer and computer software program may automatically or semi-automatically assign the one or more physical medium applied wherein one or more portion and/or proportion of the given athlete's bottom-tier common physical property data, and/or one or more portion and/or proportion of the given athlete's top-tier uncommon physical property data exceeds one or more assigned data set value; or a person manually assigns the one or more physical medium applied wherein one or more portion and/or proportion of the given athlete's bottom-tier common physical property data, and/or one or more portion and/or proportion of the given athlete's top-tier uncommon physical property data exceeds one or more assigned data set value.

A function of assigning one or more physical medium to produce the physical medium product 21 wherein one or more portion and/or proportion of one given athlete's bottom-tier common physical property data and/or one or more portion and/or proportion of the given athlete's top-tier uncommon physical property data exceeds one or more assigned data set value is to mark physical property data set value variations among product 21.

Additionally or alternatively, and to be completed by computer and computer software program, the physical illustration medium attachment process 25 includes methods which correlate, assimilate, scale, and sort one given athlete's intellectual property data and/or physical property data among one or more physical medium product 21. Methods which correlate, assimilate, scale, and sort the given athlete's intellectual property data and/or physical property data among product 21 include, but are not limited to, methods described prior, and is best understood by referencing an example as follows.

For example, and within the physical illustration medium attachment process 25, correlation is defined among one or more portion and/or proportion of one given athlete's bottom-tier common intellectual property data (previously assimilated among one or more portion and/or proportion of the given athlete's top-tier uncommon intellectual property data within the digital illustration medium process 5 first step 5*a*), and one or more portion and/or proportion of computer physical medium design software program data. For reference purpose, and within the process 25, correlation is defined for the function of mathematical assimilation, as described in forthcoming paragraphs below. A computer and computer physical medium design software program may automatically or semi-automatically define correlation and may automatically or semi-automatically render correlation, or a person manually defines correlation and manually renders correlation.

For reference purpose, and within the physical illustration medium attachment process 25 as well as the product manufacture system 130, it should be known that computer software program data is data attached to a computer software program tool, and includes, but is not limited to, data sets and data set values. A computer software program tool is defined as a computer software program product and/or process which modifies the physical medium product 21, and is best understood by referencing an example as follows.

For example, and within the physical illustration medium attachment process 25, a computer physical medium design software program tool includes, but is not limited to, a product and/or process which modifies the physical medium product 21, such as a computer physical medium design software program tool which modifies product 21 brightnesses, brushes, colors, contrasts, hardnesses, highlights, hues, images, lights, movements, numbers, patterns, perspectives, saturations, scales, shadows, shapes, sounds, spaces, temperatures, texts, textures, times, vibrances, videos, and/or weights thereof.

Next, and within the physical illustration medium attachment process 25, and wherein correlation is defined, one or more portion and/or proportion of one given athlete's bottom-tier common intellectual property data may be assimilated among, and one or more portion and/or proportion of, computer software program data. For reference purpose, and within the process 25, assimilation is defined as applying one or more mathematical grid, mathematical expression, and/or mathematical equation wherein one or more portion and/or proportion of the given athlete's bottom-tier common intellectual property data modifies one or more portion and/or proportion of computer software program data. A computer and computer software program may automatically or semi-automatically assimilate and may automatically or semi-automatically render the assimilation, or a person manually assimilates and manually renders the assimilation. Assimilation, as well as the process 25, is best understood by referencing an example as follows.

For example, and within the physical illustration medium attachment process 25, one portion of one given athlete's bottom-tier common intellectual property data (previously assimilated among one or more portion and/or proportion of the given athlete's top-tier uncommon intellectual property data within the digital illustration medium process 5 first step 5*a*), includes one data set and data set value of 9 athletic awards. In the example, the data set value is mathematically represented as 9. Continuing the example, one portion of computer physical medium design software program data includes one data set and data set value of 1 ounce of textile. In the example, the data set and data set value is mathematically represented as 1x. Continuing the example, and to execute assimilation, the mathematical expression (9)(1x) is applied to produce a mathematical product result of 9x. Thus, the physical medium product 21 includes 9x, or 9 ounces of textile rendered by a computer and computer physical medium design software program.

A function of assimilation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the physical medium product 21.

For reference purpose, and within the physical illustration medium attachment process 25 as well as the product manufacture system 130, it should be preferred, but not required that additional and/or alternative methods apply physical property data attached to physical property product 41. Product 41 is described in forthcoming paragraphs below.

Next, and within the physical illustration medium attachment process 25, the space wherein the physical illustration medium product 20 is attached to the physical medium product 21 is assigned. For reference purpose, and within the process 25, the assigned space wherein product 20 is attached to product 21 may be any space among product 21 wherein product 20 is visible to a physical illustration medium product 30 consumer, and wherein product 20 is visible to a tagged physical illustration medium physical property product 60 consumer wherein product 60 is attached to dock product 78. Product 60 and product 78 are described in forthcoming paragraphs below.

Figure 4:
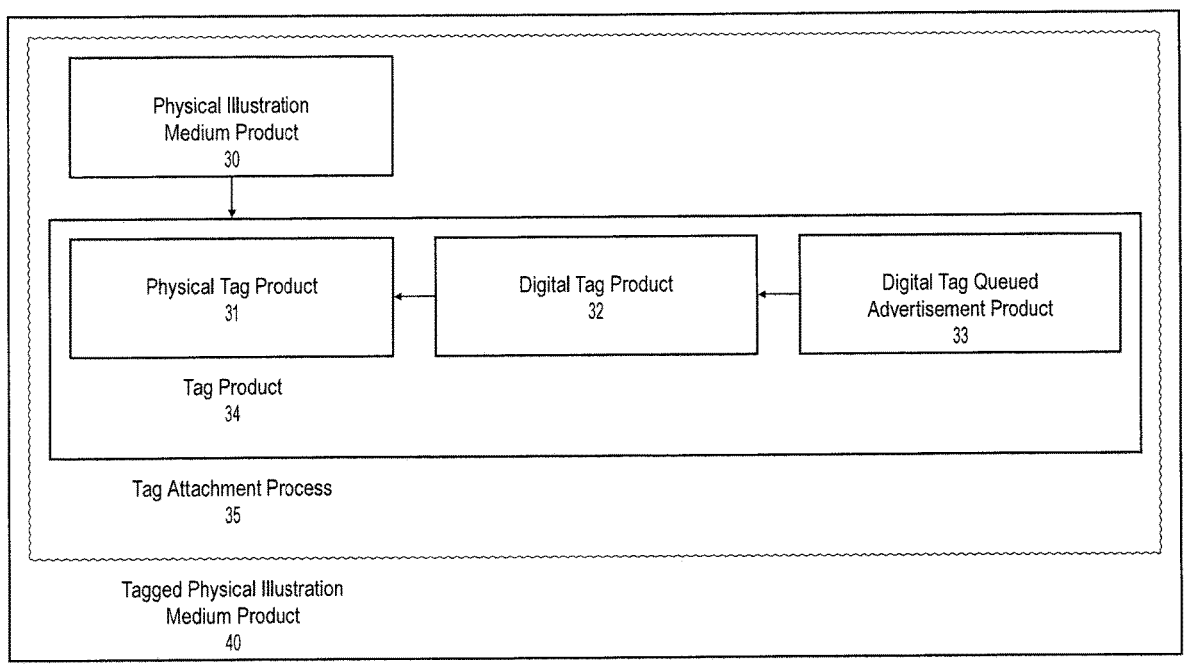
FIG. 4 is a block flow diagram of a tag attachment process, which produce a tagged physical illustration medium product.

FIG. 4 shows a block flow diagram of a new and useful tag attachment process 35, and tagged physical illustration medium product 40. The product 40 comprises the physical illustration medium product 30 attached to one or more tag product 34. The product 34 includes one or more physical tag product 31 attached to one or more digital tag product 32; attached to one or more digital tag queued advertisement product 33. The process 35 includes assigning the space wherein product 34 is attached to product 30, and additionally or alternatively, includes methods which correlate, assimilate, scale, and sort one given athlete's intellectual property and/or physical property data among product 32, and is summarized briefly as follows. For reference purpose, product 31 is summarized first.

The physical tag product 31 comprises the physical medium embodiment of one or more tag, wherein one or more digital tag product 32, as well as one or more digital tag queued advertisement product 33 may be automatically or semi-automatically attached by a computer and computer software program, such as a computer quick response (QR) code tag design software program; a computer near-field communication (NFC) proximity tag design software program; a computer digital audio/video medium design software program; and/or a computer advertisement serving software program, for example.

For reference purposes, and within the tag attachment process 35, it should be known that one or more applicable physical medium assigned to produce the physical tag product 31 includes, but is not limited to, any applicable physical medium assigned prior, and/or described prior.

For reference purpose, and within the tag attachment process 35, it should be known that one or more applicable conductive, resistive, reactive, and/or conduit physical medium grid, as well as one or more applicable computer microchip may be attached among one or more applicable physical medium assigned prior, and/or described prior. The physical tag product 31 is best understood by referencing examples as follows.

For example, and within the tag attachment process 35, one ink physical medium, and one textile physical medium is applied to produce the physical tag product 31, wherein the ink physical medium includes a computer QR code, and the ink physical medium is attached to the textile physical medium. For reference purpose, and within the tag attachment process 35, it should be known that a computer QR code hosts and transmits data.

Next, and within the tag attachment process 35, one or more physical tag product 31 is attached to one or more digital tag product 32. The product 32 comprises one or more digital medium which produces, processes, hosts, serves, and/or modifies one given athlete's intellectual property data and/or physical property data—such as the given athlete's bottom-tier common intellectual property data (previously assimilated among one or more portion and/or proportion of the given athlete's top-tier uncommon intellectual property data within the digital illustration medium process 5 first step 5*a*), for example—and includes, but is not limited to, any digital medium embodiment of a number, text, image, illustration, audio, and/or video—such as synchronized digital audio and video, for example. The product 32 produces, processes, hosts, serves, and/or modifies the given athlete's intellectual property data and/or physical property data among one or more product 32 consumer digital medium receiver device, and the product 32 is transmitted to the product 32 consumer digital medium receiver device by product 31, and/or by one or more applicable computer network and/or computer network software program.

For reference purpose, and within the tag attachment process 35, it should be known that a digital medium receiver device includes, but is not limited to, any digital medium receiver device which may receive product 32 transmissions, such as any digital phone, digital tablet, digital watch, or digital headset, for example.

Additionally or alternatively, and to be completed by computer and computer software program, the tag attachment process 25 includes methods which correlate, assimilate, scale, and sort mark one given athlete's intellectual property data and/or physical property data among one or more digital tag product 32. Methods which correlate, assimilate, scale, and sort the given athlete's intellectual property and/or physical property data among product 32 include, but are not limited to, methods described prior, and is best understood by referencing examples as follows.

For example, and within the tag attachment process 25, correlation is defined among one or more portion and/or proportion of one given athlete's bottom-tier common intellectual property data (previously assimilated among one or more portion and/or proportion of the given athlete's top-tier uncommon intellectual property data within the digital illustration medium process 5 first step 5*a*), and one or more portion and/or proportion of computer digital audio/video medium design software program data. For reference purpose, and within the process 25, correlation is defined for the function of mathematical assimilation, as described in forthcoming paragraphs below. A computer and computer digital audio/video medium design software program may automatically or semi-automatically define correlation and may automatically or semi-automatically render correlation, or a person manually defines correlation and manually renders correlation.

Next, and within the tag attachment process 25, and wherein correlation is defined, one or more portion and/or proportion of one given athlete's bottom-tier common intellectual property data may be assimilated among, and one or more portion and/or proportion of, computer software program data. For reference purpose, and within the process 25, assimilation is defined as applying one or more mathematical grid, mathematical expression, and/or mathematical equation wherein one or more portion and/or proportion of the given athlete's bottom-tier common intellectual property data modifies one or more portion and/or proportion of computer software program data. A computer and computer software program may automatically or semi-automatically assimilate and may automatically or semi-automatically render the assimilation, or a person manually assimilates and manually renders the assimilation. Assimilation, as well as the process 25, is best understood by referencing an example as follows.

For example, and within the tag attachment process 25, one portion of one given athlete's bottom-tier common intellectual property data (previously assimilated among one or more portion and/or proportion of the given athlete's top-tier uncommon intellectual property data within the digital illustration medium process 5 first step 5*a*), includes one data set and data set value of 9 athletic awards. In the example, the data set value is mathematically represented as 9. Continuing the example, one portion of computer digital audio/video medium design software program data includes one data set and data set value of 1 minute of time. In the example, the data set and data set value is mathematically represented as 1x. Continuing the example, and to execute assimilation, the mathematical expression (9)(1x) is applied to produce a mathematical product result of 9x. Thus, the digital tag product 32 includes 9x, or 9 minutes of time rendered by a computer and computer digital audio/video medium design software program.

A function of assimilation is to mark the space and/or time wherein one or more portion and/or proportion of one given athlete's bottom-tier common intellectual property data is assimilated (compressed and hosted) among one or more portion and/or proportion of the given athlete's top-tier uncommon intellectual property data, as well as among the digital tag product 32.

Next, and within the tag attachment process 35, one or more digital tag queued advertisement product 33 may be attached to one or more digital tag product 32. The product 33 comprises one or more digital tag product 32 advertisement, and the product 33 may be queued to be produced, processed, hosted, served, and/or modified among product 32. For reference purpose, and within the process 35 as well as the product manufacture system 130, it should be known an advertisement is defined as any paid and/or unpaid, public and/or nonpublic notice to the product 32 consumer; and an advertisement may be queued to be produced, processed, hosted, served, and/or modified among one or more space and/or time, such as the space and/or time of one given athlete's athletic event, for example.

Additionally or alternatively, and within the tag attachment process 35, one or more digital tag product 32, as well as one or more digital tag queued advertisement product 33 may be automatically or semi-automatically attached to one or more applicable physical medium assigned to produce the docked tagged physical illustration medium physical property product 90 by a computer and computer software program—such as a computer augmented reality tag design software program, for example. Product 90 is described in forthcoming paragraphs below.

Figure 5:
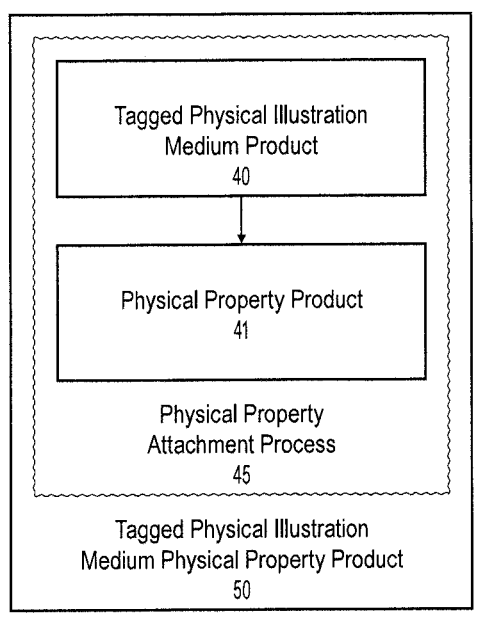
FIG. 5 is a block flow diagram of a physical property attachment process, which produces a tagged physical illustration medium physical property product.

FIG. 5 shows a block flow diagram of a new and useful physical property attachment process 45, and tagged physical illustration medium physical property product 50. The product 50 comprises the tagged physical illustration medium product 40 attached to one or more physical property product 41. Product 41 comprises one or more portion and/or proportion of one given athlete's physical property. The process 45 includes assigning one or more applicable physical medium to attach product 41 to product 40; includes assigning the space wherein product 41 may be attached to the product 40; additionally or alternatively, includes methods which correlate, assimilate, scale, and sort one given athlete's physical property and/or intellectual property data among the assigned physical medium applied to attach product 41 to product 40, and is summarized briefly as follows. For reference purpose, and within the product manufacture system 130, it should be reminded that physical property data is data attached to physical property, and includes, but is not limited to, data sets and data set values.

Physical property may be defined as a tangible property manufactured, in part or in whole, by one given athlete and includes, but is not limited to, any physical medium applied by, and/or attached to the given athlete among the space and/or time of one or more of the given athlete's athletic events, such as athletic textiles previously applied by, and/or attached to the given athlete's body among the space and/or time of one athletic event, for example. For reference purpose, and within the product manufacture system 130, it should be reminded that physical property data is previously hosted and/or served among one hierarchical tier database structure, wherein the physical property data is sorted by previous measurements of space and/or time. One hierarchical tier database structure includes, but is not limited to, one or more top tier and one or more bottom tier, and is best understood by referencing an example as follows.

For example, and within the product manufacture system 130, one given athlete's physical property data includes, but is not limited to, the physical property data (including physical property thereof) previously hosted and/or served among one hierarchical tier database structure most similar in nature to the served database structure product of one partitioned Web search engine results page, wherein previously measured uncommon physical property data sorted by space and/or time is further sorted among one top tier of the database structure, and wherein previously measured common physical property data sorted by space and/or time is further sorted among one bottom tier of the database structure. For reference purpose, and within the product manufacture system 130, it should be reminded that uncommon physical property data may be defined as the given athlete's previously measured data of largest variation from a central tendency; and common physical property data may be defined as the given athlete's previously measured data of smallest and/or no variation from a central tendency. A variation includes, but is not limited to, any measure of deviation, standard deviation, absolute variation, variance, and/or any combination thereof, for example. A central tendency includes, but is not limited to, any mean, median, mode, and/or any combination thereof, for example.

Within the physical property attachment process 45, one or more physical medium may be applied to attach one or more physical property product 41 to the tagged physical illustration medium product 40 wherein one or more portion and/or proportion of one given athlete's bottom-tier common physical property data and/or one or more portion and/or proportion of the given athlete's top-tier uncommon physical property data exceeds one or more assigned data set value. A computer and computer software program, such as computer physical medium design software program, for example, may automatically or semi-automatically assign one or more data set value wherein one or more portion and/or proportion of the given athlete's bottom-tier common physical property data, and/or one or more portion and/or proportion of the given athlete's top-tier uncommon physical property data must exceed to apply one or more physical medium; or a person manually assigns one or more data set value wherein one or more portion and/or proportion of the given athlete's bottom-tier common physical property data, and/or one or more portion and/or proportion of the given athlete's top-tier uncommon physical property data must exceed to apply one or more physical medium.

Furthermore, a computer and computer software program may automatically or semi-automatically assign the one or more physical property product 41 to be attached, as well as the one or more physical medium applied to attach product 41 to tagged physical illustration medium product 40 wherein one or more portion and/or proportion of the given athlete's bottom-tier common physical property data, and/or one or more portion and/or proportion of the given athlete's top-tier uncommon physical property data exceeds one or more assigned data set value; or a person manually assigns the one or more physical medium applied wherein one or more portion and/or proportion of the given athlete's bottom-tier common property data, and/or one or more portion and/or proportion of the given athlete's top-tier uncommon property data exceeds one or more assigned data set value.

Assigning the one or more physical property product 41 to be attached, as well as the one or more physical medium applied to attach product 41 to tagged physical illustration medium product 40 wherein one or more portion and/or proportion of the given athlete's bottom-tier common physical property data, and/or one or more portion and/or proportion of the given athlete's top-tier uncommon physical property data exceeds one or more assigned data set value is best understood by referencing an example as follows.

For example, within the physical property attachment process 45, and wherein one portion of one given athlete's bottom-tier common physical property data exceeds one assigned data set value, one textile physical medium is applied to attach one physical property product 41 to the tagged physical illustration medium product 40. In the example, the textile physical medium applied to attach product 41 to product 40 further produces thermal sensory stimuli among the textile physical medium, and the produced thermal sensory stimuli is served among the space and/or time of the given athlete's one athletic event.

A function of assigning the one or more physical property product 41 to be attached, as well as the one or more physical medium applied to attach product 41 to tagged physical illustration medium product 40 wherein one or more portion and/or proportion of one given athlete's bottom-tier common physical property data, and/or one or more portion and/or proportion of the given athlete's top-tier uncommon physical property data exceeds one or more assigned data set value is to mark physical property data set value variations among the tagged physical illustration medium physical property product 50.

Additionally or alternatively, and within the physical property attachment process 45, one or more physical medium may be applied to attach one or more physical property product 41 to the tagged physical illustration medium product 40 wherein one or more portion and/or proportion of one given athlete's bottom-tier common intellectual property data (previously sorted within the digital illustration medium process 5 first step 5a) and/or one or more portion and/or proportion of the given athlete's top-tier uncommon intellectual property data (previously sorted within the digital illustration medium process 5 first step 5a) exceeds one or more assigned data set value. A computer and computer software program may automatically or semi-automatically assign one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium; or a person manually assigns one or more data set value wherein one or more portion and/or proportion of the given athlete's bottom-tier common intellectual property data, and/or one or more portion and/or proportion of the given athlete's top-tier uncommon intellectual property data must exceed to apply one or more physical medium.

Furthermore, a computer and computer software program may automatically or semi-automatically assign the one or more physical property product 41 to be attached, as well as the one or more physical medium applied to attach product 41 to tagged physical illustration medium product 40 wherein one or more portion and/or proportion of the given athlete's bottom-tier common intellectual property data, and/or one or more portion and/or proportion of the given athlete's top-tier uncommon intellectual property data exceeds one or more assigned data set value; or a person manually assigns the one or more physical medium applied wherein one or more portion and/or proportion of the given athlete's bottom-tier common intellectual property data, and/or one or more portion and/or proportion of the given athlete's top-tier uncommon intellectual property data exceeds one or more assigned data set value.

Additionally or alternatively, and to be completed by computer and computer software program, the physical property attachment process 45 includes methods which correlate, assimilate, scale, and sort one given athlete's physical property data and/or intellectual property data among one or more physical medium applied to attach one or more physical property product 41 to tagged physical illustration medium product 40. Methods which correlate, assimilate, scale, and sort the given athlete's physical property data and/or intellectual property data among the one or more physical medium include, but are not limited to, methods described prior, and is best understood by referencing examples as follows.

For example, and within the physical property attachment process 45, correlation is defined among one or more portion and/or proportion of one given athlete's bottom-tier common physical property data, and one or more portion and/or proportion of computer physical medium design software program data. For reference purpose, and within the process 45, correlation is defined for the function of mathematical assimilation, as described in forthcoming paragraphs below. A computer and computer physical medium design software program automatically or semi-automatically defines correlation and automatically or semi-automatically renders correlation, or a person manually defines correlation and manually renders correlation.

Next, and within the physical property attachment process 45, and wherein correlation is defined, one or more portion and/or proportion of one given athlete's bottom-tier common physical property data may be assimilated among and one or more portion and/or proportion of computer software program data. For reference purpose, and within the process 45, assimilation is defined as applying one or more mathematical grid, mathematical expression, and/or mathematical equation wherein one or more portion and/or proportion of the given athlete's bottom-tier common physical property data modifies one or more portion and/or proportion of computer software program data. A computer and computer software program may automatically or semi-automatically assimilate and may automatically or semi-automatically render the assimilation, or a person manually assimilates and manually renders the assimilation. Assimilation, as well as the process 45, is best understood by referencing an example as follows.

For example, and within the physical property attachment process 45, one portion of one given athlete's bottom-tier common physical property data includes one data set and data set value of 9 colors. In the example, the data set value is mathematically represented as 9. Continuing the example, one portion of computer physical medium design software program data includes one data set and data set value of 1 ounce of textile. In the example, the data set and data set value is mathematically represented as 1x. Continuing the example, and to execute assimilation, the mathematical expression $(9)(1x)$ is applied to produce a mathematical product result of 9x. Thus, the physical medium product includes 9x, or 9 ounces of textile rendered by a computer and computer physical medium design software program.

A function of assimilation is to mark the space and/or time wherein one or more portion and/or proportion of one given athlete's bottom-tier common physical property data or top-tier uncommon physical property data is assimilated (compressed and hosted) among the physical medium product.

Next, and within the physical property attachment process 45, the space wherein one or more physical property product 41 is attached to the tagged physical illustration medium product 40 may be assigned. For reference purpose, and within the process 45, the assigned space wherein product 41 is attached to product 40 may be any space among product 40 wherein product 41 is visible to a tagged physical illustration medium physical property product 50 consumer, and wherein product 41 is visible to a tagged physical illustration medium physical property product 60 consumer wherein product 60 is attached to dock product 78. Product 60 and product 78 are described in forthcoming paragraphs below.

For reference purpose, and within the physical property attachment process 45, it should be preferred, but not required, that the assigned space wherein one or more physical property product 41 is attached to the tagged physical illustration medium product 40 may be space described prior wherein one given athlete's intellectual property data and/or physical property data is correlated, assimilated, scaled, and sorted among one or more physical illustration medium product 20; and/or may be space described prior wherein the given athlete's intellectual property data and/or physical property data is correlated, assimilated, scaled, and sorted among physical medium product 21; and/or may be space described prior wherein the given athlete's intellectual property data and/or physical property data is correlated, assimilated, scaled, and sorted among physical illustration medium product 30.

Figure 6:
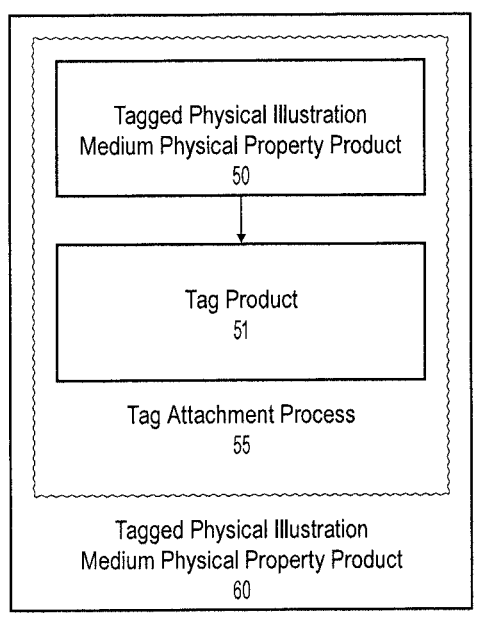
FIG. 6 is a block flow diagram of a tag attachment process, which produces a tagged physical illustration medium physical property product.

FIG. 6 shows a block flow diagram of a new and useful tag attachment process 55, and tagged physical illustration medium physical property product 60. The product 60 comprises the tagged physical illustration medium physical property product 50 attached to one or more tag product 51. The process 55 includes assigning the space wherein product 50 is attached to product 51; and is summarized briefly as follows. For reference purpose, product 51 is summarized first.

The tag product 51 comprises the physical medium embodiment of one or more tag. For reference purpose, and within the tag attachment process 55, it should be known that one or more applicable physical medium assigned to produce the tag product 51 includes, but is not limited to, any applicable physical medium assigned prior, and/or described prior. For reference purpose, and within the tag attachment process 55, it should be known that one or more applicable conductive, resistive, reactive, and/or conduit physical medium grid, as well as one or more applicable computer microchip may be attached among one or more applicable physical medium assigned prior, and/or described prior. The tag product 51 is best understood by referencing an example as follows. For example, and within the tag attachment process 55, one ink physical medium, and one textile physical medium is applied to produce the tag product 51, wherein the ink physical medium includes tagged physical illustration medium physical property product 50 manufacture system 130 data attached to product 50, such as product 50 manufacture system 130 data sets and data set values, for example, and the ink physical medium is attached to the textile physical medium.

Next, and within the tag attachment process 55, the space wherein the tagged physical illustration medium physical property product 50 is attached to one or more tag product 51 is assigned. For reference purpose, and within the process 55, the assigned space wherein product 50 is attached to product 51 may be any space among product 50 wherein product 51 is visible to a tagged physical illustration medium physical property product 60 consumer, and wherein product 51 is visible to a product 60 consumer wherein product 60 is attached to dock product 78. Product 78 is described in forthcoming paragraphs below.

A function of tag product 51 is to produce, process, host, serve, and/or modify tagged physical illustration medium physical property product 50 manufacture system 130 data attached to product 50, as well as product 50 manufacture system 130 data attached to the tagged physical illustration medium physical property product 60.

Figure 7:
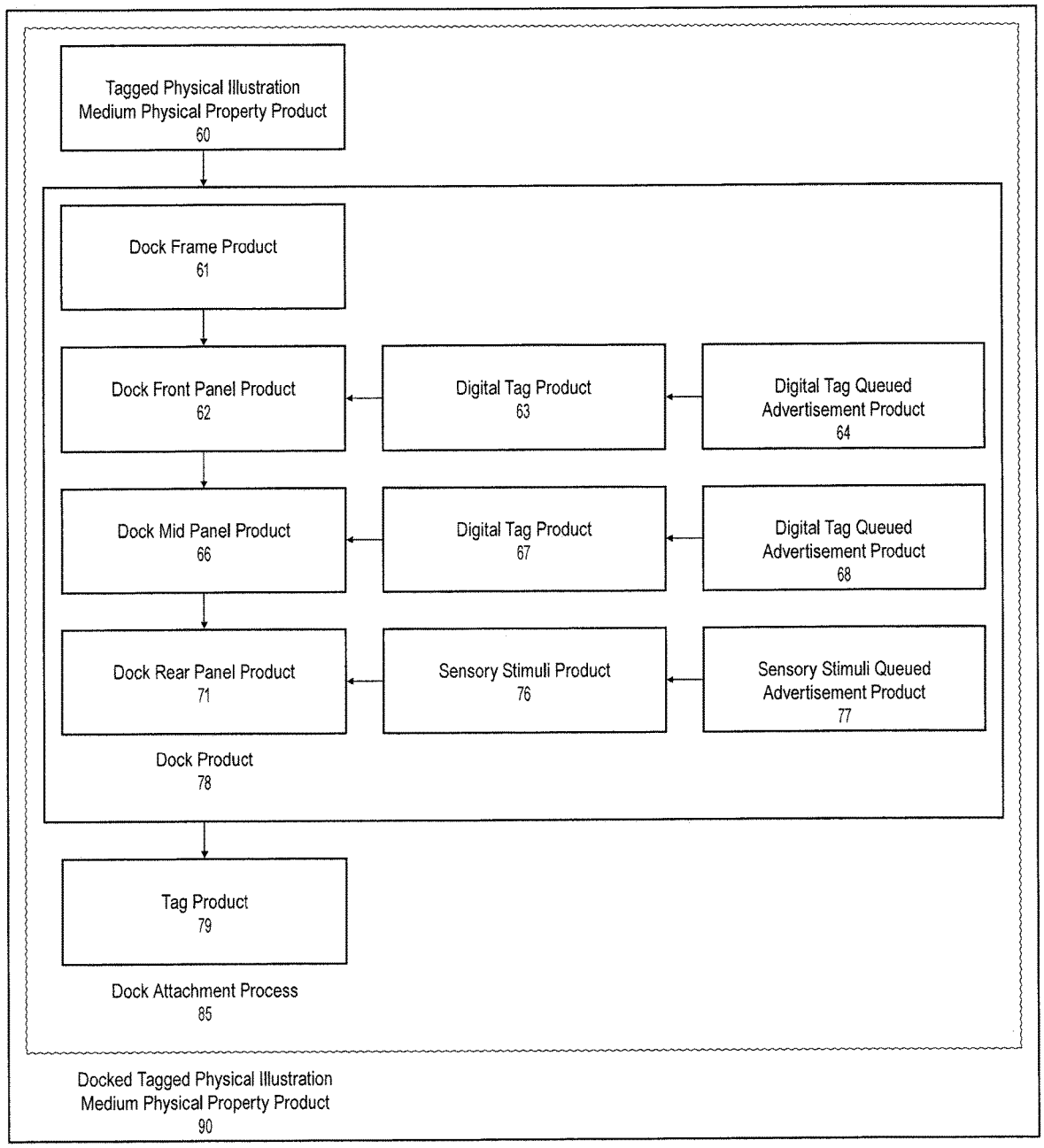
FIG. 7 is a block flow diagram of a dock attachment process, which produces a docked tagged physical illustration medium physical property product.

FIG. 7 shows a block flow diagram of a new and useful dock attachment process 85, and docked tagged physical illustration medium physical property product 90. The product 90 comprises the tagged physical illustration medium physical property product 60 attached to one dock product 78, attached to one or more tag product 79. The product 78 includes one dock frame product 61; attached to one dock front panel product 62 wherein one or more digital tag product 63 and one or more digital tag queued advertising product 64 is attached; further attached to one dock mid panel product 66 wherein one or more digital tag product 67 and one or more digital tag queued advertising product 68 is attached; even further is attached one dock rear panel product 71 wherein one or more sensory stimuli product 76 and one or more sensory stimuli queued advertising product 77 is attached. The process 85 includes assigning the applicable physical mediums to produce products 61, 62, 66, 71, 79; assigning the spaces wherein products 60, 61, 62, 66, 71, 79 are attached; assigning spaces and/or times wherein product 71 applies products 76; additionally or alternatively, includes methods which correlate, assimilate, scale, and sort one given athlete's intellectual property and/or physical property data among products 61, 62, 66, 79; and is summarized briefly as follows. For reference purpose, product 61 is summarized first.

The dock frame product 61 comprises the physical medium embodiment of a frame attached to dock front panel product 62. Product 62 is described in forthcoming paragraph below. For reference purpose, and within the dock attachment process 85, the assigned space wherein product 61 is attached to product 62 may be any space among the front perimeter of product 62.

For reference purpose, and within the dock attachment process 85, it should be known that one or more applicable physical medium assigned to produce dock frame product 61, dock front panel product 62, dock mid panel product 66, dock rear panel product 71, and tag product 79 includes, but is not limited to, any applicable physical medium assigned prior, and/or described prior.

Additionally or alternatively, any process and/or method described prior which assigns one or more applicable physical medium may be applied among products 61, 62, 66, 79, and any process and/or method described prior which correlates, assimilates, scales, and sorts one given athlete's intellectual property data and/or physical property data may be applied among products 61, 62, 66, 79, as well as digital tag product 63 and digital tag product 67.

For reference purpose, and within the dock attachment process 85, it should be known that one or more applicable computer microchip and one or more applicable infrared grid, and/or tracking, radar, motion, and/or voice sensor may be attached among one or more applicable physical medium, wherein the attached computer microchip and the attached grid and/or sensors may further be directly and/or indirectly attached to one or more applicable computer network and/or computer network software program, and wherein the attachments may even further produce, process, host, serve, and/or modify intellectual property data and/or physical property data; as well as sensory stimuli among docked tagged physical illustration medium physical property product 90, and among the space and/or time of one or more applicable event, such as the space and/or time of one given athlete's athletic event, for example.

For reference purpose, within the dock attachment process 85, and wherein one or more applicable computer microchip may be operated by electric current produced, processed, hosted, served, and/or modified by one or more battery, it should be known that one or more applicable physical medium assigned to produce dock product 78 (one or more applicable physical medium assigned to produce dock frame product 61, dock front panel product 62, dock mid panel product 66, and dock rear panel product 71) may modify battery maintenance functions, such as the function of inducing electric current to maintain a battery charge, for example.

The dock frame product 61 is best understood by referencing examples as follows.

For example, and within the dock attachment process 85, one metal physical medium with attached computer microchip and infrared grid may be applied to produce the dock frame product 61, and product 61 may be attached among dock front panel product 62. For reference purpose, and within the process 85, it should be known that an attached infrared grid may be projected from product 61 among product 62, and interact with one or more product 61 consumer hand command. An attached tracking, radar, and/or motion sensor interacts with one or more product 61 consumer eye command and/or body command. An attached voice sensor interacts with one or more product 61 consumer voice command.

Next, and within the dock attachment process 85, the dock frame product 61 may be attached to the dock front panel product 62. The product 62 is the transparent or semi-transparent physical medium embodiment of a digital medium receiver device, wherein one or more digital tag product 63, as well as one or more digital tag queued advertisement product 64 may be automatically or semi-automatically attached by a computer and computer software program, such as a computer digital audio/video medium design software program; and/or a computer advertisement serving software program, for example.

For reference purpose, and within the dock attachment process 85, it should be known that a digital medium receiver device comprises a device which may receive digital tag product 63 transmissions, similar to any digital phone, digital tablet, digital watch, or digital headset, for example. The digital tag product 63 comprises one or more digital medium which produces, processes, hosts, serves, and/or modifies one given athlete's intellectual property data and/or physical property data, such as the given athlete's assimilated intellectual property data (described prior within the digital illustration medium process 5 first step 5*a*), for example, and includes, but is not limited to, any digital medium embodiment of a number, text, image, illustration, audio, and/or video, such as synchronized digital audio and video, for example. The product 63 produces, processes, hosts, serves, and/or modifies the given athlete's intellectual property data and/or physical property data among product 62, and product 63 is transmitted to product 62 by one or more applicable physical medium assigned to produce the docked tagged physical illustration medium physical property product 90, and/or by one or more applicable computer network and/or computer network software program.

The digital tag queued advertisement product 64 comprises one or more digital tag product 63 advertisement, and the product 64 may be queued to be produced, processed, hosted, served, and/or modified among product 63. For reference purpose, and within the dock attachment process 85 as well as the product manufacture system 130, it should be known an advertisement comprises any paid and/or unpaid, public and/or nonpublic notice to the product 63 consumer; and an advertisement may be queued to be produced, processed, hosted, served, and/or modified among one or more space and/or time, such as the space and/or time of one given athlete's athletic event, for example.

Additionally or alternatively, and within the dock attachment process 85, one or more digital tag product 63, as well as one or more digital tag queued advertisement product 64 may be automatically or semi-automatically attached to one or more applicable physical medium assigned to produce the docked tagged physical illustration medium physical property product 90 by a computer and computer software program, such as a computer augmented reality tag design software program, for example.

The dock front panel product 62 is best understood by referencing examples as follows.

For example, and within the dock attachment process 85, one light-projecting glass physical medium with attached computer microchip may be applied to produce the dock front panel product 62, and one digital tag product 63 may be attached among product 62. For reference purposes, and within the process 85, it should be known that product 63 is projected from product 62 among product 62.

A function of assigning one or more transparent or semi-transparent physical medium to produce the dock front panel product 62 is to securely host (i.e. conceal) and securely serve (i.e. reveal) tagged physical illustration medium physical property product 60 to the product 60 consumer.

Next, and within the dock attachment process 85, the dock front panel product 62 may be attached to the dock mid panel product 66. The product 66 comprises the opaque physical medium embodiment of a digital medium receiver device, wherein one or more digital tag product 67, as well as one or more digital tag queued advertisement product 68 may be automatically or semi-automatically attached by a computer and computer software program, such as a computer digital audio/video medium design software program, and/or a computer advertisement serving software program, for example. For reference purpose, and within the dock attachment process 85, the assigned space wherein product 62 is attached to product 66 may be any space among the front perimeter of product 66.

For reference purpose, and within the dock attachment process 85, it should be known that a digital medium receiver device is a device which may receive digital tag product 67 transmissions, similar to any digital phone, digital tablet, digital watch, or digital headset, for example.

The digital tag product 67 comprises one or more digital medium which produces, processes, hosts, serves, and/or modifies one given athlete's intellectual property data and/or physical property data—such as the given athlete's assimilated intellectual property data (described prior within the digital illustration medium process 5 first step 5*a*), for example—and includes, but is not limited to, any digital medium embodiment of a number, text, image, illustration, audio, and/or video—such as synchronized digital audio and video, for example. The product 67 produces, processes, hosts, serves, and/or modifies the given athlete's intellectual property data and/or physical property data among product 66, and product 67 may be transmitted to product 66 by one or more applicable physical medium assigned to produce the docked tagged physical illustration medium physical property product 90, and/or by one or more applicable computer network and/or computer network software program.

The digital tag queued advertisement product 68 comprises one or more digital tag product 67 advertisement, and the product 68 may be queued to be produced, processed, hosted, served, and/or modified among product 67. For reference purpose, and within the dock attachment process 85 as well as the product manufacture system 130, it should be known that an advertisement is defined as any paid and/or unpaid, public and/or nonpublic notice to the product 67 consumer; and an advertisement may be queued to be produced, processed, hosted, served, and/or modified among one or more space and/or time, such as the space and/or time of one given athlete's athletic event, for example.

Additionally or alternatively, and within the dock attachment process 85, one or more digital tag product 67, as well as one or more digital tag queued advertisement product 68 may be automatically or semi-automatically attached to one or more applicable physical medium assigned to produce the docked tagged physical illustration medium physical property product 90 by a computer and computer software program—such a computer augmented reality tag design software program, for example.

The dock mid panel product 66 is best understood by referencing examples as follows.

For example, and within the dock attachment process 85, one light-projecting plastic physical medium with attached computer microchip may be applied to produce the dock mid panel product 66, and one digital tag product 67 is attached among product 66. For reference purpose, and within the process 85, it should be known that product 67 may be projected from product 66 among product 66. A function of assigning one or more opaque physical medium to produce the dock mid panel product 66 is to securely host (i.e. conceal) and securely serve (i.e. reveal) tagged physical illustration medium physical property product 60 to the product 60 consumer.

Next, and within the dock attachment process 85, the tagged physical illustration medium physical property product 60 may be attached to the dock rear panel product 71, and the dock mid panel product 66 may be attached to product 71. The product 71 may be the opaque physical medium embodiment of a digital medium receiver device, wherein one or more sensory stimuli product 76, as well as one or more sensory stimuli queued advertisement product 77 may be automatically or semi-automatically attached by a computer and computer software program, such as a computer sensory stimuli design software program, and/or a computer advertisement serving software program, for example. For reference purpose, and within the dock attachment process 85, the assigned space wherein product 60 is attached to product 71 may be any space among the front perimeter of product 71, and the assigned space wherein product 66 is attached to product 71 may be any space among the front perimeter of product 71.

For reference purpose, and within the dock attachment process 85 as well as the product manufacture system 130, it should be known that sensory stimuli includes, but is not limited to, optical, tactile, and/or thermal sensory stimuli. One or more applicable physical medium assigned to produce the dock rear panel product 71 indirectly produces, processes, hosts, serves, and/or modifies sensory stimuli among the tagged physical illustration medium physical property product 60, wherein sensory stimuli product 76 is transmitted to, and received by product 71. Additionally or alternatively, one or more applicable physical medium assigned to produce product 60 directly produces, processes, hosts, serves, and/or modifies sensory stimuli among product 60, wherein sensory stimuli product 76 is transmitted to, and received by product 60. Product 76 is described in forthcoming paragraphs below.

For reference purpose, and within the dock attachment process 85 as well as the product manufacture system 130, sensory stimuli may be defined as one or more stimulus served to, and/or processed by the products 71, 60 consumer somatic and/or special senses, such as consumer nervous system senses of sight (ophthalmoception), touch (tactioception), temperature (thermoception), sound, (audioception), and/or vibration (mechanoreception), for example. Sensory stimuli may be served to, and/or processed by products 71, 60 consumer nervous system senses at one or more space among product 60 wherein intellectual property data and/or physical property data is correlated, assimilated, scaled, and/or sorted, such as positive value intellectual property data correlated, assimilated, scaled, and/or sorted at positive value space among product 60. Additionally or alternatively, sensory stimuli may be served to, and/or processed by product 71, 60 consumer nervous system senses concurrent to one or more space and/or time wherein new intellectual property data and/or physical property data is manufactured by one given athlete, such as concurrent to the space and/or time of the given athlete's one athletic event, for example.

A function of sensory stimuli product 76 is to mark the space and/or time wherein one or more portion and/or proportion of the given athlete's bottom-tier common intellectual property data is assimilated (compressed and hosted) among one or more portion and/or proportion of the given athlete's top-tier uncommon intellectual property data, as well as among product 60. Product 76 is described in forthcoming paragraphs below.

For reference purpose, and within the dock attachment process 85, it should be known that a digital medium receiver device is a device which may receive sensory stimuli product 76 transmissions, similar to any digital phone, digital tablet, digital watch, or digital headset, for example. Product 76 is described in forthcoming paragraphs below. The sensory stimuli product 76 is one or more digital medium—such as one digital image, for example—which modifies one or more physical medium—such as one physical diode (i.e. light-emitting diode), for example. The product 76 produces, processes, hosts, serves, and/or modifies sensory stimuli among the tagged physical illustration medium physical property product 60. The product 76 may be transmitted to products 71, 60 by one or more applicable physical medium assigned to produce the docked tagged physical illustration medium physical property product 90, and/or by one or more applicable computer network and/or computer network software program.

The sensory stimuli queued advertisement product 77 comprises one or more sensory stimuli product 76 advertisement, and the product 77 is queued to be produced, processed, hosted, served, and/or modified among product 76. For reference purpose, and within the dock attachment process 85 as well as the product manufacture system 130, it should be known an advertisement is defined as any paid and/or unpaid, public and/or nonpublic notice to the products 71, 60 consumer; and an advertisement may be queued to be produced, processed, hosted, served, and/or modified among one or more space and/or time, such as the space and/or time of one given athlete's athletic event, for example.

Additionally or alternatively, and within the dock attachment process 85, one or more sensory stimuli product 76, as well as one or more sensory stimuli queued advertisement product 77 may be automatically or semi-automatically attached to one or more applicable physical medium assigned to produce the docked tagged physical illustration medium physical property product 90 by a computer and computer software program, such as a computer augmented reality tag design software program, for example.

The sensory stimuli product 76 is best understood by referencing examples as follows.

For example, and within the dock attachment process 85, eighty physical diodes may be applied to produce the dock rear panel product 71, and one sensory stimuli product 76 is attached among product 71. For reference purpose, and within the process 85, it should be known that product 76 is one digital image, and product 76 is projected from product 71 among product 71, as well as among the tagged physical illustration medium physical property product 60. A function of assigning one or more opaque physical medium to produce the dock rear panel product 71 is to securely host (i.e. conceal) and securely serve (i.e. reveal) tagged physical illustration medium physical property product 60 to the product 60 consumer.

Next, and within the dock attachment process 85, the dock product 78 may be attached to the tag product 79. The product 79 comprises one or more example of tag product 34 (described prior within the tag attachment process 35), and the assigned space wherein product 79 is attached to product 78 may be any space among the front perimeter of product 78.

Figure 8:
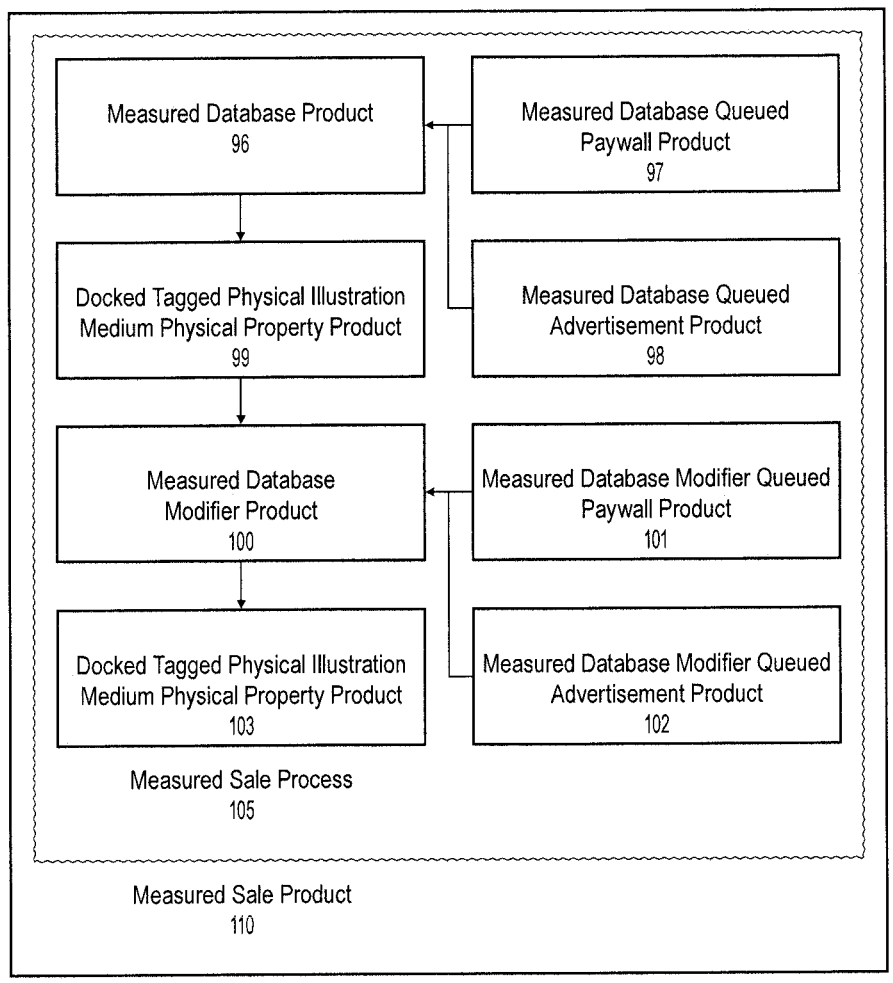
FIG. 8 is a block flow diagram of a measured sale process, which produces a measured sale product.

FIG. 8 shows a block flow diagram of a new and useful measured sale process 105, and measured sale product 110. The product 110 comprises a computer software program to be produced, processed, hosted, served, and/or modified among one or more product 110 consumer digital medium receiver device. The product 110 includes a measured database product 96 wherein one or more measured database queued paywall product 97 and one or more measured database queued advertisement product 98 are attached; further attached to one or more docked tagged physical illustration medium physical property product 99; even further attached to a measured database modifier product 100 wherein one or more measured database modifier queued paywall product 101 and one or more measured database modifier queued advertisement product 102 are attached; and still further attached to one or more docked tagged physical illustration medium physical property product 103. The process 105 includes assigning the spaces and/or times wherein products 97, 98, 101, 102 are attached, and is summarized briefly as follows. For reference purpose, it should be known that product 110 may be transmitted to the consumer digital medium receiver device by dock tagged physical illustration medium physical property product 90, and/or by one or more applicable computer network and/or computer network software program; it should be known that a digital medium receiver device includes, but is not limited to, any digital medium receiver device described prior. For reference purpose, product 96 is summarized first.

The measured database product 96 comprises the digital medium embodiment of a computer software program, such as a computer measured database software program, for example. The computer software program may measure and record a product 96 consumer's intellectual property data and/or physical property data preferences; measure and record intellectual property data and/or physical property data among one or more docked tagged physical illustration medium physical property product 99; and apply the measures and records to produce, process, host, serve, and/or modify one or more cohort of product 99, wherein preferred measures and records of intellectual property data and/or physical property data is among the one or more cohort of product 99, and wherein the one or more cohort of product 99 is available for sale to a product 96 consumer. For reference purpose, and within the measured sale process 105, it should be known that product 99 comprises the digital medium embodiment of docked tagged physical illustration medium physical property product 90.

For reference purpose, and within the measured sale process 105, it should be known that measured database product 96 may include one or more standardized test served to a product 96 consumer, wherein the standardized test may automatically or semi-automatically measure and record a product 96 consumer's intellectual property data and/or physical property data preferences.

The measured database queued paywall product 97 comprises one or more measured database product 96 paywall which may be automatically or semi-automatically attached to product 96 by a computer software program, such as a computer paywall software program, for example, and the product 97 may be queued to be produced, processed, hosted, served, and/or modified among product 96. For reference purpose, and within the measured sale process 105 as well as the product manufacture system 130, it should be known that a paywall is defined as any modifiable restriction to the product 96 consumer modified by paid fee; and a paywall may be queued to be produced, processed, hosted, served, and/or modified among one or more space and/or time, such as the space and/or time of one given athlete's athletic event, for example.

The measured database queued advertisement product 98 comprises one or more measured database product 96 advertisement, which may be automatically or semi-automatically attached to product 96 by a computer software program, such as a computer advertisement serving software program, for example, and the product 98 may be queued to be produced, processed, hosted, served, and/or modified among product 96. For reference purpose, and within the measured sale process 105 as well as the product manufacture system 130, it should be known an advertisement is defined as any paid and/or unpaid, public and/or nonpublic notice to the product 96 consumer; and an advertisement may be queued to be produced, processed, hosted, served, and/or modified among one or more space and/or time, such as the space and/or time of one given athlete's athletic event, for example.

Next, and within the measured sale process 105, the one or more cohort of docked tagged physical illustration medium physical property product 99 may be attached to the measured database modifier product 100. The product 100 comprises the digital medium embodiment of a computer software program, such as a computer measured database update software program, for example. The computer software program may measure and record any new intellectual property data and/or physical property data manufactured by one given athlete; and may apply any new measures and records to produce, process, host, serve, and/or modify one or more cohort of docked tagged physical illustration medium physical property product 103 updated by product 100; wherein preferred measures and records of new intellectual property data and/or physical property data may be among the one or more cohort of product 103 updated by product 100; and wherein the one or more cohort of product 103 updated by product 100 may be available for sale to a product 100 consumer. Additionally or alternatively, the computer software program may measure and record any new intellectual property data and/or physical property data manufactured by one given product 100 consumer and/or one given product 100 manufacturer; and may apply any new measures and records to produce, process, host, serve, and/or modify one or more cohort of docked tagged physical illustration medium physical property product 103 updated by product 100; wherein preferred measures and records of new intellectual property data and/or physical property data may be among the one or more cohort of product 103 updated by product 100; and wherein the one or more cohort of product 103 updated by product 100 is available for sale to a product 100 consumer. For reference purpose, and within the measured sale process 105, it should be known that product 103 comprises the digital medium embodiment of product 99 updated by product 100.

For reference purpose, and within the measured sale process 105, it should be known that measured database modifier product 100 may include one or more standardized update served to a product 100 consumer, wherein the standardized update may automatically or semi-automatically apply any new measures and records concurrent to one or more space and/or time, such as concurrent to the space and/or time of one given athlete's athletic event, for example.

The measured database modifier queued paywall product 101 comprises one or more measured database modifier product 100 paywall automatically or semi-automatically attached to product 100 by a computer software program, such as a computer paywall software program, for example, and the product 101 may be queued to be produced, processed, hosted, served, and/or modified among product 100. For reference purpose, and within the measured sale process 105 as well as the product manufacture system 130, it should be known that a paywall may be defined as any modifiable restriction to the product 100 consumer modified by paid fee; and a paywall may be queued to be produced, processed, hosted, served, and/or modified among one or more space and/or time, such as the space and/or time of one given athlete's athletic event, for example.

The measured database modifier queued advertisement product 102 comprises one or more measured database modifier product 100 advertisement which may be automatically or semi-automatically attached to product 100 by a computer software program, such as a computer advertisement serving software program, for example, and the product 102 may be queued to be produced, processed, hosted, served, and/or modified among product 100. For reference purpose, and within the measured sale process 105 as well as the product manufacture system 130, it should be known an advertisement may be defined as any paid and/or unpaid, public and/or nonpublic notice to the product 100 consumer; and an advertisement may be queued to be produced, processed, hosted, served, and/or modified among one or more space and/or time, such as the space and/or time of one given athlete's athletic event, for example.

A function of the measured sale product 110 is to compress the search for, and/or modification of docked tagged physical illustration medium physical property product 103 available for sale to a product 110 consumer.

For reference purpose, and within the measured sale process 105, it may be preferred, but not required that one or more additional computer software program, such as a computer product consumer payment software program, for example, may be attached among the measured sale product 110 to process the payment for products 96, 99, 100, 103 available for sale to a product 110 consumer.

Figure 9:
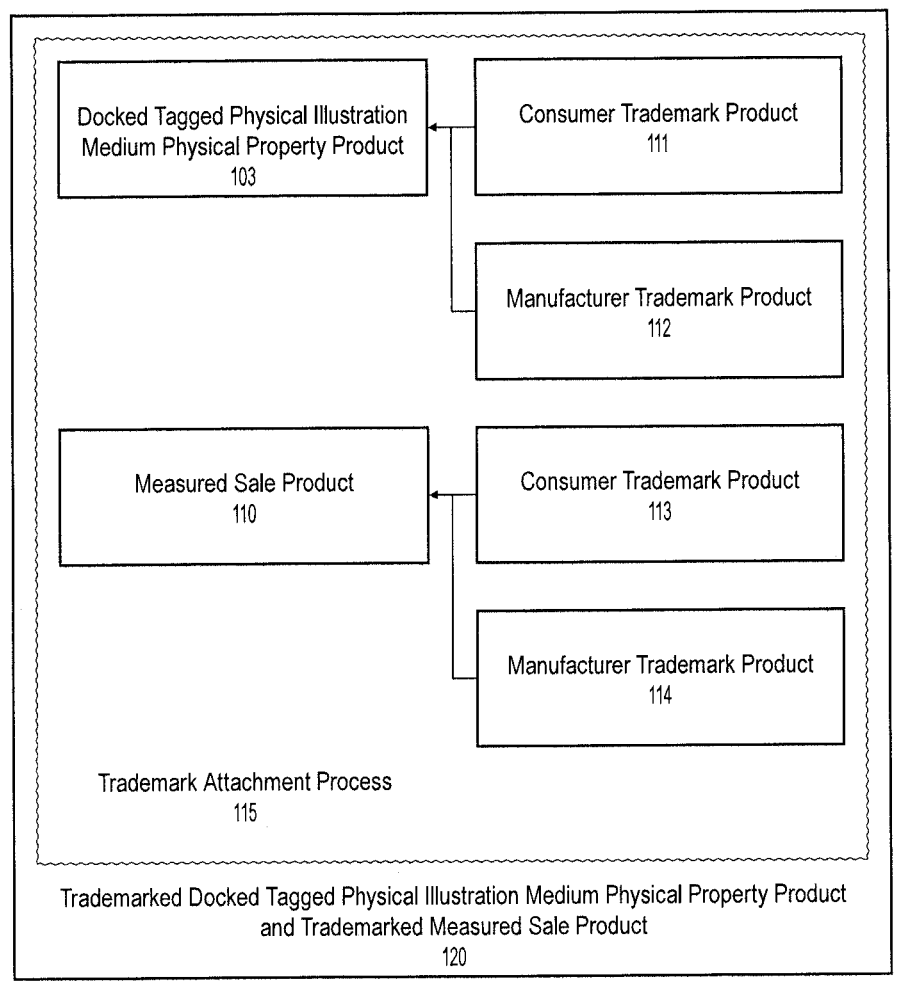
FIG. 9 is a block flow diagram of a trademark attachment process, which produces a trademarked docked tagged physical illustration medium physical property product and trademarked measured sale product.

FIG. 9 shows a block flow diagram of a new and useful trademark attachment process 115, and trademarked docked tagged physical illustration medium physical property product, trademarked measured sale product 120. The product 120 includes a docked tagged physical illustration medium physical property product 103 wherein one or more consumer trademark product 111 and one or more manufacturer trademark product 112 is attached; and a measured sale product 110 wherein one or more consumer trademark product 113 and one or more manufacturer trademark product 114 is attached. The process 115 includes assigning the spaces and/or times wherein trademark products 111, 112, 113, 114 are attached, and is summarized briefly as follows.

For reference purpose, and within the trademark attachment process 115 as well as the product manufacture system 130, it should be known that a trademark is defined as a design and/or character manufacturing mark.

The consumer trademark product 111 and consumer trademark product 113 comprises the digital medium embodiment of one or more trademark attached to the docked tagged physical illustration medium physical property product 103 and/or the measured sale product 110. Products 111, 113 may be automatically or semi-automatically rendered and attached among products 103, 110 by a computer software program, such as a computer measured database update software program, for example. For reference purpose, and within the trademark attachment process 115, it should be preferred, but not required, that products 111, 113 are attached among products 103, 110 wherein the measured database modifier product 100 previously measured and recorded any new intellectual property data and/or physical property data manufactured by one given product 100 consumer; and applied any new measures and records to produce, process, host, serve, and/or modify one or more cohort of docked tagged physical illustration medium physical property product 103 updated by product 100; wherein preferred measures of new intellectual property data and/or physical property data was among one or more cohort of product 103 updated by product 100; and wherein one or more cohort of product 103 updated by product 100 was sold to a product 100 consumer.

The manufacturer trademark product 112 and manufacturer trademark product 114 comprises the digital medium embodiment of one or more trademark attached to the docked tagged physical illustration medium physical property product 103 and/or the measured sale product 110. Products 112, 114 may be automatically or semi-automatically rendered and attached among products 103, 110 by a computer software program, such as a computer measured database update software program, for example. For reference purpose, and within the trademark attachment process 115, it should be preferred, but not required, that products 112, 114 are attached among products 103, 110 wherein the measured database modifier product 100 previously measured and recorded any new intellectual property data and/or physical property data manufactured by one given product 100 manufacturer; and applied any new measures and records to produce, process, host, serve, and/or modify one or more cohort of docked tagged physical illustration medium physical property product 103 updated by product 100; wherein preferred measures of new intellectual property data and/or physical property data was among one or more cohort of product 103 updated by product 100; and wherein one or more cohort of product 103 updated by product 100 was sold to a product 100 consumer.

A function of trademarked docked tagged physical illustration medium physical property product and trademarked measured sale product 120 may be to mark the docked tagged physical illustration medium physical property product 103 sold to a product 110 consumer, wherein product 103 applied measured database modifier product 100.

Figure 10:
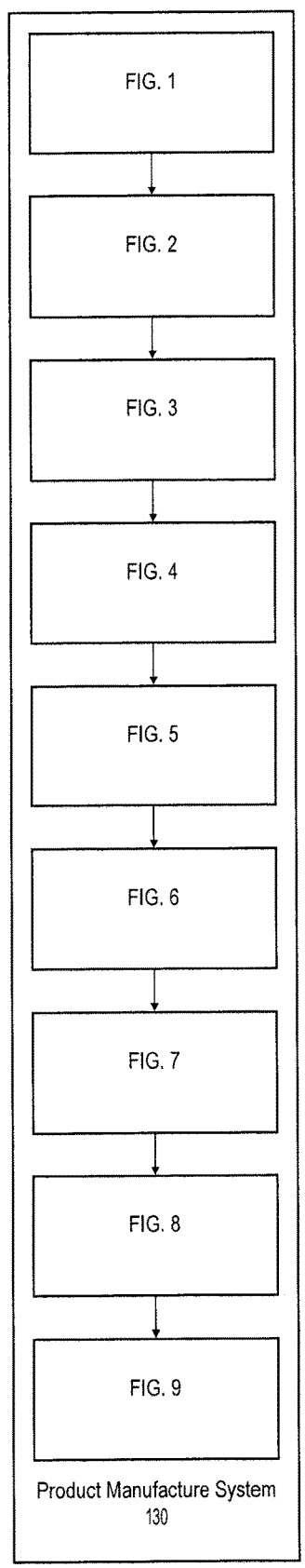
FIG. 10 is a block flow diagram of the product manufacture system.

FIG. 10 shows a block flow diagram of a new and useful product manufacture system 130. The system 130 is one manufacture system applied by one or more trademarked docked tagged physical illustration medium physical property product and trademarked digital application product 120 manufacturer. The system 130 comprises processes 5, 5a, 5b, 15, 25, 35, 45, 55, 85, 105, 115 and products 10, 20, 21, 30, 31, 32, 33, 34, 40, 41, 50, 51, 60, 61, 62, 63, 64, 66, 67, 68, 71, 76, 77, 78, 79, 90, 96, 97, 98, 99, 100, 101, 102, 103, 110, 111, 112, 113, 114, 120 attached by a product 120 manufacturer, as represented by FIG. 1-FIG. 9. For reference purpose, and solely for purpose of illustrating general principles and construction of the system 130, it should be reminded that the embodiment of one given individual is not limited to one given athlete, and may be any other one given individual, such as one given entertainer, for example; and/or may be any other one given cohort of individuals, such as one given cast of entertainers, for example; and/or may be any other one given individual object which produces previously measured intellectual property data and/or physical property data; and/or may be any other one given cohort of individual objects which produces previously measured intellectual property data and/or physical property data.

Figure 11:
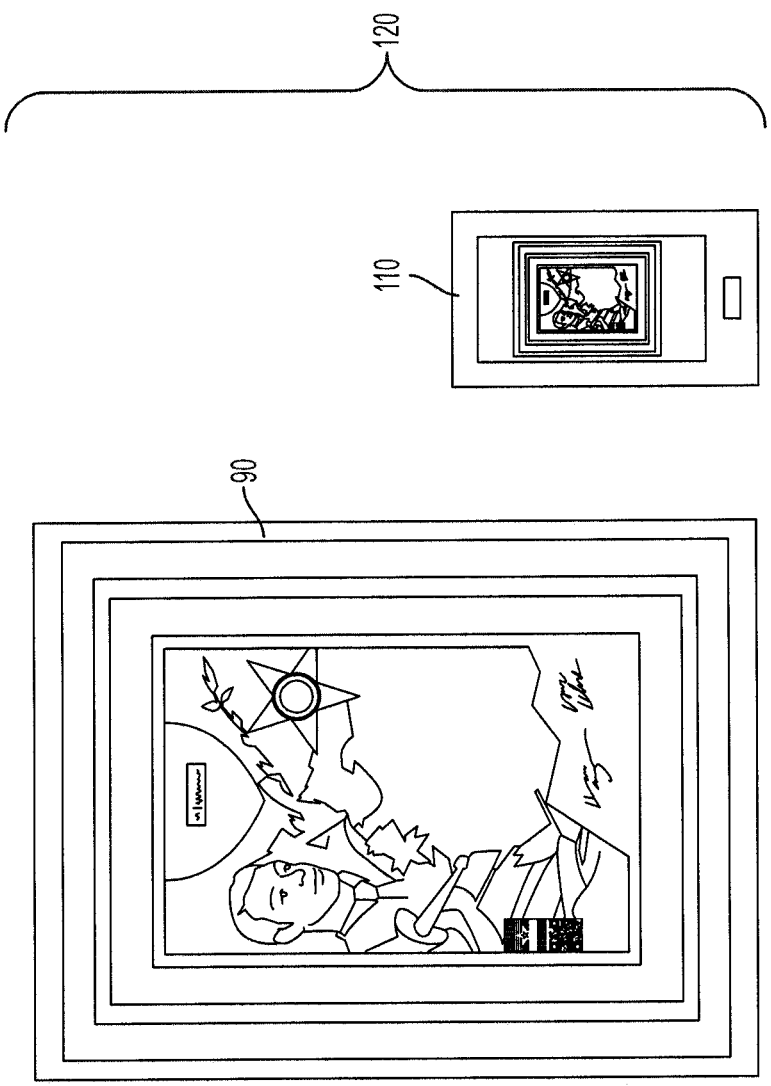
FIG. 11 is an orthogonal view drawing of trademarked docked tagged physical illustration medium physical property product and trademarked measured sale product manufactured by the product manufacture system.

FIG. 11 shows an orthogonal view drawing of new and useful trademarked docked tagged physical illustration medium physical property product and trademarked measured sale product 120 manufactured by the product manufacture system 130.

Figure 12:
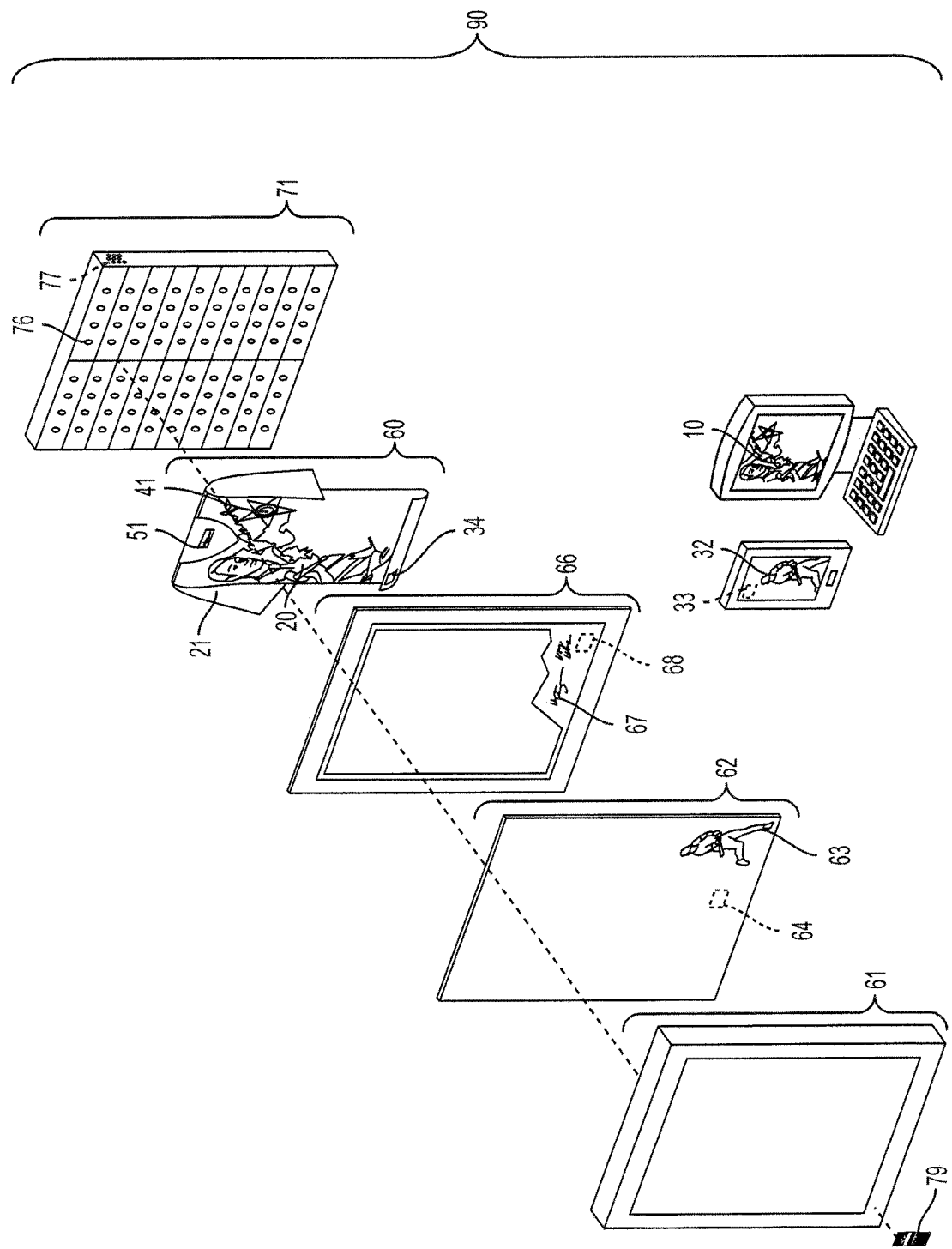
FIG. 12 is an exploded view drawing of docked tagged physical illustration medium physical property product manufactured by the product manufacture system.

FIG. 12 shows an exploded view drawing of new and useful docked tagged physical illustration medium physical property product 90 manufactured by the product manufacture system 130.

Each of the characteristics and exemplary embodiments described above, and combinations thereof, may be said to be encompassed by the present invention. The present invention is thus drawn to the following non-limiting aspects:

Aspect 1. A data-based interactive fashion memorabilia product comprising a digital illustration medium as substantially described in the specification and accompanying drawings.

Aspect 2. A computer-implemented method for manufacturing a digital illustration product, the method comprising: receiving, by a computer having a processor and a memory, a data set comprising two or more individual data items related to an intellectual property output and a physical property output of an individual; defining the individual data items of the data set based on a variation from a central tendency; sorting the individual data items into a common data set and an uncommon data set based on the defining, wherein the common data set includes the individual data items having a minimal variation or no variation from the central tendency, and the uncommon data set includes the individual data items having a maximal variation from the central tendency; correlating one or more of the individual data items in the common data set with one or more of the individual data items in the uncommon data set to form a correlative data item; assimilating uncommon data of the correlative data item with common data of the correlative data, wherein the assimilating comprises applying a mathematical grid, algorithm, or equation to modifying the uncommon data of the correlative data item with one or more portion of the common data of the correlative data item; scaling two or more assimilated correlative data items based on a magnitude of the variation from the central tendency; and producing an illustration data set comprising the scaled assimilated correlative data item Aspect 3. The computer-implemented method according to aspect 2, further comprising: rendering a digital illustration image based on the illustration data set.

Aspect 4. The computer-implemented method according to aspects 2 or 3, further comprising: sorting the individual data items in the common data set and the uncommon data set based on a space, time, or combination thereof of the individual data items.

Aspect 5. The computer-implemented method according to any of aspects 2 to 4, further comprising: correlating one or more of the individual data items in the common data set with one or more actions of an illustration rendering process to form a second correlative data item; and modifying at least a portion of the digital illustration based on the second correlative data item.

Aspect 6. The computer-implemented method according to aspect 5, wherein the one or more actions of an illustration rendering process includes applying one or more of brightnesses, brushes, colors, contrasts, hardnesses, highlights, hues, images, lights, movements, numbers, patterns, perspectives, saturations, scales, shadows, shapes, sounds, spaces, temperatures, texts, textures, times, vibrances, videos, or weights.

Aspect 7. The computer-implemented method according to any of aspects 2 to 6, wherein the digital illustration image further comprises at least one digital tag associated with one or more portions thereof.

Aspect 8. The computer-implemented method according to aspect 7, wherein the at least one digital tag provides an augmented reality display.

Aspect 9. The computer-implemented method according to aspect 8, wherein the augmented reality display comprises a static image, video image, or audio output of: one or more of a queued advertisement, the individual data items related to the individual, or a new data item related to the individual.

Aspect 10. The computer-implemented method according to any of aspects 2 to 9, wherein the defining may be by the computer or may be by a user of the computer-implemented method.

Aspect 11. The computer-implemented method according to any of aspects 2 to 10, wherein the central tendency includes a mean, median, mode, or any combination thereof of the data set.

Aspect 12. The computer-implemented method according to any of aspects 2 to 11, wherein the variation from the central tendency comprises a measure of deviation, standard deviation, absolute variation, variance, or any combination thereof.

Aspect 13. The computer-implemented method according to any of aspects 2 to 12, wherein the individual is an athlete.

Aspect 14. The computer-implemented method according to any of aspects 2 to 13, wherein intellectual property output comprises any number, text, image, audio, and/or video manufactured by the athlete or regarding the athlete.

Aspect 15. The computer-implemented method according to any of aspects 2 to 14, wherein physical property output comprises any physical medium applied by, and/or attached to, the athlete among a space and/or a time of one or more of an athletic event of the athlete.

Aspect 16. The computer-implemented method according to any of aspects 2 to 15, wherein the physical property output comprises an event-applied textile.

Aspect 17. The computer-implemented method according to any of aspects 2 to 16, wherein a user of the method may modify one or more of: the data set received by the computer, the definition of the individual data items of the data set, or the correlation of the individual items in the data set.

Aspect 18. An article of clothing comprising a physical representation of the illustration data set produced by the method of aspect 2 or 3.

Aspect 19. The article of clothing according to aspects 18, further comprising a tag which may be readable by a portable unit, wherein the tag comprises a bar code, QR code, wireless sensor, location based sensor, or a combination thereof.

Aspect 20. The article of clothing according to aspect 19, wherein the tag is associated with at least one digital tag on the physical representation of the illustration data set which provides an augmented reality display on a portable unit.

Aspect 21. The article of clothing according to aspect 20, wherein the augmented reality display comprises a static image, video image, or audio output of one or more of a queued advertisement.

Aspect 22. The article of clothing according to either of aspects 20 or 21, wherein the augmented reality display comprises a static image, video image, or audio output of one or more of the individual data items related to the individual.

Aspect 23. The article of clothing according to any of aspects 20 to 22, wherein the augmented reality display comprises a static image, video image, or audio output of a new data item related to a recent event of the individual.

Aspect 24. The article of clothing according to aspect 23, wherein the recent event comprises an athletic event of the individual.

Aspect 25. The article of clothing according to any of aspects 20 to 24, wherein the portable unit is a phone, tablet, watch, and/or headset device.

Aspect 26. The article of clothing according to any of aspects 19 to 25, further comprising: one or more sensors which respond to direct or indirect signals, wherein direct signals include body signals of a user and indirect signals include wireless communication signals, wherein the at least one digital tag associated with the physical representation of the illustration data set activates a subset of the one or more sensors in response to the direct or indirect signals.

Aspect 27. The article of clothing according to aspect 26, wherein the responsive elements comprise tracking sensors, radar sensors, heat sensors, motion sensors, light sensors, infrared lights, led lights, and a combination thereof.

Aspect 28. A non-transitory computer readable medium including executable instructions for executing the method according to any of aspects 2 to 17.

Aspect 29. A dock station for an article of clothing comprising a physical representation of an illustration data set product, the dock station comprising: a back panel comprising a grid of one or more type of responsive elements; a transparent front panel; an outer frame which secures the transparent front panel to the back panel; and a wireless communication device, wherein the responsive elements respond to signals received by the wireless communication device, body signals of a user, or a combination thereof.

Aspect 30. The dock station according to aspect 29, wherein the responsive elements comprise tracking sensors, radar sensors, heat sensors, motion sensors, lights sensors, infrared lights, led lights, and a combination thereof.

Aspect 31. The dock station according to any of aspects 29 or 30, further comprising: the article of clothing according to aspect 18, wherein the article of clothing is arranged on and secured between the back panel and the transparent front panel.

Aspect 32. The dock station according to aspect 31, wherein the article of clothing further comprises a tag which may be readable by a portable unit, wherein the physical tag comprises a bar code, QR code, wireless sensor, location based sensor, or a combination thereof.

Aspect 33. The dock station according to aspect 32, wherein the tag is associated with at least one digital tag on the physical representation of the digital illustration which provides an augmented reality display on a portable unit.

Aspect 34. The dock station according to aspect 33, wherein the augmented reality display comprises a static image, video image, or audio output of one or more of: a queued advertisement, the individual data items related to the individual, or a new data item related to the individual.

What is claimed is:

1. An article of clothing comprising:
   a digital illustration product produced by a method for manufacturing the digital illustration product comprising:
   receiving, by a computer having a processor and a memory, a data set comprising two or more individual data items related to an intellectual property output and a physical property output of an individual;
   defining the individual data items of the data set based on a variation from a central tendency;
   sorting the individual data items into a common data set and an uncommon data set based on the defining, wherein the common data set includes the individual data items having a minimal variation or no variation from the central tendency, and the uncommon data set includes the individual data items having a maximal variation from the central tendency;
   correlating one or more of the individual data items in the common data set and one or more of the individual data items in the uncommon data set to form a correlative data item;
   assimilating uncommon data of the correlative data item and common data of the correlative data item to produce an assimilated data set;
   scaling the assimilated data set based on one or more portion of the common data of the correlative data item to produce an illustration data set; and
   sorting the assimilated data set by at least one of space and time based on at least one of the one or more portion of the common data of the correlative data item and a previous measured space and time sortation of the illustration data set, and
   wherein the article of clothing comprises a tag which may be readable by a portable unit, wherein the tag comprises a bar code, QR code, wireless sensor, location based sensor, or a combination thereof.

2. The article of clothing of claim 1, further comprising: rendering a digital illustration image based on the illustration data set.

3. The article of clothing of claim 1, further comprising, before producing the illustration data set:
   sorting the individual data items in the common data set and the uncommon data set based on a space, time, or combination thereof of the individual data items.

4. The article of clothing of claim 1, further comprising, before producing the illustration data set:
   correlating one or more of the individual data items in the common data set with one or more actions of an illustration rendering process to form a second correlative data item; and
   modifying at least a portion of the assimilated data set based on the second correlative data item.

5. The article of clothing of claim 2, wherein the digital illustration image further comprises at least one digital tag associated with one or more portions thereof, wherein the at least one digital tag provides an augmented reality display.

6. The article of clothing of claim 5, wherein the augmented reality display comprises a static image, video image, or audio output of: one or more of a queued advertisement, the individual data items related to the individual, or a new data item related to the individual.

7. The article of clothing of claim 1, wherein the central tendency includes a mean, median, mode, or any combination thereof of the data set.

8. The article of clothing of claim 7, wherein the variation from the central tendency comprises a measure of deviation, standard deviation, absolute variation, variance, or any combination thereof.

9. The article of clothing of claim 1, wherein intellectual property output comprises any number, text, image, audio, and/or video.

10. The article of clothing of claim 1, wherein a user of the method may modify one or more of: the data set received by the computer, the definition of the individual data items of the data set, or the correlation of the individual items in the data set.

11. The article of clothing of claim 1, further comprising:
a physical portion of the physical property output of the individual, wherein the physical property output comprises an event-applied textile.

12. The article of clothing of claim 1, wherein the tag is associated with at least one digital tag on the physical representation of the illustration data set which provides an augmented reality display on a portable unit.

13. The article of clothing of claim 12, wherein the augmented reality display comprises an image, audio and/or video output of one or more of: a queued advertisement, the individual data items related to the individual, or a new data item related to the individual.

14. The article of clothing of claim 1, further comprising:
one or more sensors which respond to direct or indirect signals, wherein direct signals include body signals of a user and indirect signals include wireless communication signals, wherein the at least one digital tag associated with the physical representation of the illustration data set activates a subset of the one or more sensors in response to the direct or indirect signals.

15. The article of clothing of claim 14, wherein the responsive elements comprise tracking sensors, radar sensors, heat sensors, motion sensors, light sensors, infrared lights, led lights, and a combination thereof.

16. A dock station for the article of clothing according to claim 1, the dock station comprising:
a back panel comprising a grid of one or more type of responsive elements;
a transparent front panel;
an outer frame which secures the transparent front panel to the back panel; and
a wireless communication device;
wherein the article of clothing is arranged on and secured between the back panel and the transparent front panel, and
wherein at least a subset of the responsive elements respond to signals received by the wireless communication device, body signals of a user, or a combination thereof.

17. The dock station of claim 16, wherein the responsive elements comprise tracking sensors, voice sensors, radar sensors, heat sensors, motion sensors, light sensors, infrared lights, led lights, and a combination thereof.

18. The dock station of claim 16, wherein the tag on the article of clothing is associated with at least one digital tag on the physical representation of the digital illustration which provides an augmented reality display on a portable unit, wherein the augmented reality display comprises a static image, video image, or audio output of one or more of: a queued advertisement, the individual data items related to the individual, or a new data item related to the individual.

19. The article of clothing of claim 1, wherein the individual is one of an athlete and a product consumer.

* * * * *